(12) United States Patent
Baig et al.

(10) Patent No.: US 7,937,292 B2
(45) Date of Patent: May 3, 2011

(54) WIDE AREA NETWORK PERSON-TO-PERSON PAYMENT

(75) Inventors: Aamer Ali Baig, Hinsdale, IL (US); James E. Cowell, Littleton, CO (US); Peter M. Karas, Lakewood, CO (US); Cheryl L. Neofytides, Putnam Valley, NY (US); Matthew F. Golub, Atlanta, GA (US); James R. Yoder, Chicago, IL (US); Susan M. Milberger, Englewood, CO (US); Jeff D. Sherrard, Lakewood, CO (US); Amy M. Dunker, Dallas, TX (US); Jackie M. Macfarlane, Parker, CO (US); Eric L. Platte, Castle Rock, CO (US); Susan F. Abrahams, Atlanta, GA (US)

(73) Assignee: The Western Union Company, Englewood, CO (US)

( * ) Notice: Subject to any disclaimer, the term of this patent is extended or adjusted under 35 U.S.C. 154(b) by 289 days.

(21) Appl. No.: 12/241,408

(22) Filed: Sep. 30, 2008

(65) Prior Publication Data

US 2009/0094155 A1    Apr. 9, 2009

Related U.S. Application Data

(60) Division of application No. 10/332,724, filed as application No. PCT/US01/22179 on Jul. 11, 2001, now Pat. No. 7,606,734, and a continuation-in-part of application No. 09/613,615, filed on Jul. 11, 2000, now Pat. No. 7,376,587.

(60) Provisional application No. 60/256,127, filed on Dec. 15, 2000.

(51) Int. Cl.
*G06Q 30/00* (2006.01)

(52) U.S. Cl. ...................................... 705/26.1; 705/27.1
(58) Field of Classification Search .................... 705/26, 705/37, 26.1, 27.1
See application file for complete search history.

(56) References Cited

U.S. PATENT DOCUMENTS 3,599,151 A    8/1971   Harr
(Continued)

FOREIGN PATENT DOCUMENTS

EP    0481135 A1    4/1992
(Continued)

OTHER PUBLICATIONS

Kuykendal, Lavonne, The Online challengers, Credit Card Management, New York: Nov. 1999. vol. 12, Iss. 8; p. 78, downloaded from ProQuestDirect on the Internet on Sep. 12, 2010, 7 pages.*
(Continued)

*Primary Examiner* — James Zurita
(74) *Attorney, Agent, or Firm* — Kilpatrick Townsend & Stockton LLP

(57) ABSTRACT

According to the invention, transferring money using a computer network is disclosed. In one step, information is saved on credit received for a first user (110) in a stored value account on a server computer system (170). At the server computer system (170), a request from the first user (110) to send money to a second user (130) based on the stored value account is received. An electronic notification is sent from the server computer (170) to the second user (130) to notify the second user (130) of the request. A debit in the stored value account of the first user (110) is created. The requested money is sent to the second user (130) upon a receipt of a request at the server computer (170) from the second user (130).

14 Claims, 11 Drawing Sheets

U.S. PATENT DOCUMENTS

| | | |
|---|---|---|
| 3,783,755 A | 1/1974 | Lagin |
| 3,833,395 A | 9/1974 | Gosnell |
| 4,032,931 A | 6/1977 | Haker |
| 4,321,672 A | 3/1982 | Braun et al. |
| 4,454,414 A | 6/1984 | Benton |
| 4,562,340 A | 12/1985 | Tateisi et al. |
| 4,562,341 A | 12/1985 | Ohmae et al. |
| 4,630,200 A | 12/1986 | Ohmae et al. |
| 4,633,397 A | 12/1986 | Macco |
| 4,678,895 A | 7/1987 | Tateisi et al. |
| 4,722,554 A | 2/1988 | Pettit |
| 4,812,628 A | 3/1989 | Boston et al. |
| 4,902,881 A | 2/1990 | Janku |
| 4,961,142 A | 10/1990 | Elliott et al. |
| 4,972,318 A | 11/1990 | Brown et al. |
| 5,021,967 A | 6/1991 | Smith |
| 5,053,607 A | 10/1991 | Carlson et al. |
| 5,119,293 A | 6/1992 | Hammond |
| 5,175,682 A | 12/1992 | Higashiyama et al. |
| 5,220,501 A | 6/1993 | Lawlor et al. |
| 5,283,829 A | 2/1994 | Anderson |
| 5,326,959 A | 7/1994 | Perazza |
| 5,350,906 A | 9/1994 | Brody et al. |
| 5,367,452 A | 11/1994 | Gallery et al. |
| 5,408,077 A | 4/1995 | Campo et al. |
| 5,426,594 A | 6/1995 | Wright et al. |
| 5,448,043 A | 9/1995 | Nakano et al. |
| 5,461,217 A | 10/1995 | Claus |
| 5,464,971 A | 11/1995 | Sutcliffe et al. |
| 5,465,206 A | 11/1995 | Hilt et al. |
| 5,477,037 A | 12/1995 | Berger |
| 5,477,038 A | 12/1995 | Levine et al. |
| 5,484,988 A | 1/1996 | Hills et al. |
| 5,491,325 A | 2/1996 | Huang et al. |
| 5,504,677 A | 4/1996 | Pollin |
| 5,510,979 A | 4/1996 | Moderi et al. |
| 5,513,117 A | 4/1996 | Small |
| 5,524,073 A | 6/1996 | Stambler |
| 5,555,496 A | 9/1996 | Tackbary et al. |
| 5,570,465 A | 10/1996 | Tsakanikas |
| 5,577,109 A | 11/1996 | Stimson et al. |
| 5,604,802 A | 2/1997 | Holloway |
| 5,622,388 A | 4/1997 | Alcordo |
| 5,629,982 A | 5/1997 | Micali |
| 5,638,283 A | 6/1997 | Herbert |
| 5,649,117 A | 7/1997 | Landry |
| 5,650,604 A | 7/1997 | Marcous et al. |
| 5,657,201 A | 8/1997 | Kochis |
| 5,664,110 A | 9/1997 | Green et al. |
| 5,677,955 A | 10/1997 | Doggett et al. |
| 5,679,940 A | 10/1997 | Templeton et al. |
| 5,699,528 A | 12/1997 | Hogan |
| 5,717,868 A | 2/1998 | James |
| 5,721,768 A | 2/1998 | Stimson et al. |
| 5,732,136 A | 3/1998 | Murphree et al. |
| 5,732,400 A | 3/1998 | Mandler et al. |
| 5,745,886 A | 4/1998 | Rosen |
| 5,757,917 A | 5/1998 | Rose et al. |
| 5,764,888 A | 6/1998 | Bolan et al. |
| 5,774,879 A | 6/1998 | Custy et al. |
| 5,778,067 A | 7/1998 | Jones et al. |
| 5,779,379 A | 7/1998 | Mason et al. |
| 5,783,808 A | 7/1998 | Josephson |
| 5,787,403 A | 7/1998 | Randle |
| 5,794,207 A | 8/1998 | Walker et al. |
| 5,815,657 A | 9/1998 | Williams et al. |
| 5,825,003 A | 10/1998 | Jennings et al. |
| 5,825,617 A | 10/1998 | Kochis et al. |
| 5,826,241 A | 10/1998 | Stein et al. |
| 5,828,875 A | 10/1998 | Halvarsson et al. |
| 5,832,463 A | 11/1998 | Funk |
| 5,870,718 A | 2/1999 | Spector |
| 5,875,435 A | 2/1999 | Brown |
| 5,878,211 A | 3/1999 | Delagrange et al. |
| 5,880,446 A | 3/1999 | Mori et al. |
| 5,884,288 A | 3/1999 | Chang et al. |
| 5,893,080 A | 4/1999 | McGurl et al. |
| 5,896,298 A | 4/1999 | Richter |
| 5,897,622 A | 4/1999 | Blinn et al. |
| 5,897,625 A | 4/1999 | Gustin et al. |
| 5,897,989 A | 4/1999 | Beecham |
| 5,898,154 A | 4/1999 | Rosen |
| 5,899,980 A | 5/1999 | Wilf et al. |
| 5,899,982 A | 5/1999 | Randle |
| 5,902,983 A | 5/1999 | Crevelt et al. |
| 5,903,881 A | 5/1999 | Schrader et al. |
| 5,909,492 A | 6/1999 | Payne et al. |
| 5,909,673 A | 6/1999 | Gregory |
| 5,910,988 A | 6/1999 | Ballard |
| 5,913,202 A | 6/1999 | Motoyama |
| 5,915,023 A | 6/1999 | Bernstein |
| 5,920,629 A | 7/1999 | Rosen |
| 5,920,847 A | 7/1999 | Kolling et al. |
| 5,920,848 A | 7/1999 | Schutzer et al. |
| 5,936,221 A | 8/1999 | Corder et al. |
| 5,937,396 A | 8/1999 | Konya |
| 5,946,669 A | 8/1999 | Polk |
| 5,949,044 A | 9/1999 | Walker et al. |
| 5,952,639 A | 9/1999 | Ohki et al. |
| 5,953,709 A | 9/1999 | Gilbert et al. |
| 5,953,710 A | 9/1999 | Fleming |
| 5,960,412 A | 9/1999 | Tackbary et al. |
| 5,963,647 A | 10/1999 | Downing et al. |
| 5,966,698 A | 10/1999 | Pollin |
| 5,974,146 A | 10/1999 | Randle et al. |
| 5,974,194 A | 10/1999 | Hirani |
| RE36,365 E | 11/1999 | Levine et al. |
| 5,987,426 A | 11/1999 | Goodwin, III |
| 5,993,047 A | 11/1999 | Novogrod et al. |
| 5,999,624 A | 12/1999 | Hopkins |
| 6,003,763 A | 12/1999 | Gallagher et al. |
| 6,011,833 A | 1/2000 | West |
| 6,012,048 A | 1/2000 | Gustin et al. |
| 6,015,087 A | 1/2000 | Seifert et al. |
| 6,027,216 A | 2/2000 | Guyton |
| 6,029,150 A | 2/2000 | Kravitz |
| 6,030,000 A | 2/2000 | Diamond |
| 6,032,133 A | 2/2000 | Hilt et al. |
| 6,032,137 A | 2/2000 | Ballard |
| 6,035,285 A | 3/2000 | Schlect et al. |
| 6,035,406 A | 3/2000 | Moussa et al. |
| 6,039,245 A | 3/2000 | Symonds et al. |
| 6,039,250 A | 3/2000 | Ito et al. |
| 6,044,360 A | 3/2000 | Picciallo |
| 6,044,362 A | 3/2000 | Neely |
| 6,045,039 A | 4/2000 | Stinson et al. |
| 6,058,417 A | 5/2000 | Hess et al. |
| 6,064,990 A | 5/2000 | Goldsmith |
| 6,070,150 A | 5/2000 | Remington et al. |
| 6,070,156 A | 5/2000 | Hartsell et al. |
| 6,070,798 A | 6/2000 | Nethery |
| 6,078,907 A | 6/2000 | Lamm |
| 6,081,790 A | 6/2000 | Rosen |
| 6,088,683 A | 7/2000 | Jalili |
| 6,088,684 A | 7/2000 | Custy et al. |
| 6,097,834 A | 8/2000 | Krouse et al. |
| 6,098,053 A | 8/2000 | Slater |
| 6,106,020 A | 8/2000 | Leef et al. |
| 6,119,106 A | 9/2000 | Mersky et al. |
| 6,119,931 A | 9/2000 | Novogrod |
| 6,122,625 A | 9/2000 | Sholom Rosen |
| 6,128,603 A | 10/2000 | Dent et al. |
| 6,134,561 A | 10/2000 | Brandien et al. |
| 6,145,738 A | 11/2000 | Stinson et al. |
| 6,148,377 A | 11/2000 | Carter et al. |
| 6,149,056 A | 11/2000 | Stinson et al. |
| 6,164,528 A | 12/2000 | Hills et al. |
| 6,167,386 A | 12/2000 | Brown |
| 6,173,272 B1 | 1/2001 | Thomas et al. |
| 6,175,823 B1 | 1/2001 | Van Dusen |
| 6,189,787 B1 | 2/2001 | Dorf |
| 6,193,152 B1 | 2/2001 | Fernando et al. |
| 6,199,761 B1 | 3/2001 | Drexler |
| 6,202,054 B1 | 3/2001 | Lawlor et al. |
| 6,206,283 B1 | 3/2001 | Bansal et al. |
| RE37,122 E | 4/2001 | Levine et al. |
| 6,223,168 B1 | 4/2001 | McGurl et al. |

| | | | | | | |
|---|---|---|---|---|---|---|
| 6,246,996 B1 | 6/2001 | Stein et al. | | 2002/0111908 A1 | 8/2002 | Milberger et al. |
| 6,247,047 B1 | 6/2001 | Wolff | | 2002/0152168 A1 | 10/2002 | Neofytides et al. |
| 6,260,024 B1 | 7/2001 | Shkedy | | 2002/0152176 A1 | 10/2002 | Neofytides et al. |
| 6,263,446 B1 | 7/2001 | Kausik et al. | | 2002/0153414 A1 | 10/2002 | Stoutenburg et al. |
| 6,269,369 B1 | 7/2001 | Robertson | | 2002/0161702 A1 | 10/2002 | Milberger et al. |
| 6,275,829 B1 | 8/2001 | Angiulo et al. | | 2003/0024979 A1 | 2/2003 | Hansen et al. |
| 6,286,756 B1 | 9/2001 | Stinson et al. | | 2003/0028491 A1 | 2/2003 | Cooper |
| 6,289,322 B1 | 9/2001 | Kitchen et al. | | 2003/0055780 A1 | 3/2003 | Hansen et al. |
| 6,292,211 B1 | 9/2001 | Pena | | 2003/0069856 A1 | 4/2003 | Seifert et al. |
| 6,292,789 B1 | 9/2001 | Schutzer | | 2003/0074311 A1 | 4/2003 | Saylors et al. |
| 6,295,522 B1 | 9/2001 | Boesch | | 2003/0111529 A1 | 6/2003 | Templeton et al. |
| 6,305,604 B1 | 10/2001 | Ono | | 2003/0120777 A1 | 6/2003 | Thompson et al. |
| 6,308,887 B1 | 10/2001 | Korman et al. | | 2003/0126036 A1 | 7/2003 | Mascavage et al. |
| 6,314,169 B1 | 11/2001 | Schelberg, Jr. et al. | | 2003/0126075 A1 | 7/2003 | Mascavage et al. |
| 6,317,745 B1 | 11/2001 | Thomas et al. | | 2003/0126083 A1 | 7/2003 | Seifert et al. |
| 6,321,211 B1 | 11/2001 | Dodd | | 2003/0130907 A1 | 7/2003 | Karas et al. |
| 6,321,987 B1 | 11/2001 | Watanabe et al. | | 2003/0130940 A1 | 7/2003 | Hansen et al. |
| 6,324,525 B1 | 11/2001 | Kramer et al. | | 2003/0135459 A1 | 7/2003 | Abelman et al. |
| 6,327,570 B1 | 12/2001 | Stevens | | 2003/0149662 A1 | 8/2003 | Shore |
| 6,327,575 B1 | 12/2001 | Katz | | 2003/0154164 A1 | 8/2003 | Mascavage et al. |
| 6,339,766 B1 | 1/2002 | Gephart | | 2003/0167237 A1 | 9/2003 | Degen et al. |
| 6,343,279 B1 | 1/2002 | Bissonette et al. | | 2003/0177067 A1 | 9/2003 | Cowell et al. |
| 6,347,305 B1 | 2/2002 | Watkins | | 2003/0187789 A1 | 10/2003 | Karas et al. |
| 6,351,739 B1 | 2/2002 | Egendorf | | 2003/0187791 A1 | 10/2003 | Weichert et al. |
| 6,356,878 B1 | 3/2002 | Walker et al. | | 2003/0187792 A1 | 10/2003 | Hansen et al. |
| 6,360,254 B1 | 3/2002 | Linden et al. | | 2003/0195811 A1 | 10/2003 | Hayes et al. |
| 6,367,693 B1 | 4/2002 | Novogrod | | 2003/0208445 A1 | 11/2003 | Compiano |
| 6,394,343 B1 | 5/2002 | Berg et al. | | 2003/0222135 A1 | 12/2003 | Stoutenburg et al. |
| 6,405,181 B2 | 6/2002 | Lent et al. | | 2003/0222136 A1 | 12/2003 | Bolle et al. |
| 6,408,284 B1 | 6/2002 | Hilt et al. | | 2003/0225689 A1 | 12/2003 | MacFarlane et al. |
| 6,411,942 B1 | 6/2002 | Fujimoto | | 2004/0015438 A1 | 1/2004 | Compiano |
| 6,415,271 B1 | 7/2002 | Turk et al. | | 2004/0024701 A1 | 2/2004 | Hansen et al. |
| 6,438,586 B1 | 8/2002 | Hass | | 2004/0059672 A1 | 3/2004 | Baig et al. |
| 6,449,599 B1 | 9/2002 | Payne et al. | | 2004/0068437 A1 | 4/2004 | McGee et al. |
| 6,453,300 B2 | 9/2002 | Simpson | | 2004/0078327 A1 | 4/2004 | Frazier et al. |
| 6,473,500 B1 | 10/2002 | Risafi et al. | | 2004/0088248 A1 | 5/2004 | Cutler |
| 6,484,936 B1 | 11/2002 | Nicoll et al. | | 2004/0088261 A1 | 5/2004 | Moore et al. |
| 6,488,203 B1 | 12/2002 | Stoutenburg et al. | | 2004/0098328 A1 | 5/2004 | Grant et al. |
| 6,502,747 B1 | 1/2003 | Stoutenburg et al. | | 2004/0098335 A1 | 5/2004 | Michelsen |
| 6,539,363 B1 | 3/2003 | Allgeier et al. | | 2004/0107165 A1 | 6/2004 | Blair et al. |
| 6,547,132 B1 | 4/2003 | Templeton et al. | | 2004/0117302 A1 | 6/2004 | Weichert et al. |
| 6,549,119 B1 | 4/2003 | Turner | | 2004/0138947 A1 | 7/2004 | McGee et al. |
| 6,554,184 B1 | 4/2003 | Amos | | 2004/0139008 A1 | 7/2004 | Muscavage et al. |
| 6,510,453 B1 | 6/2003 | Apfel et al. | | 2004/0143552 A1 | 7/2004 | Weichert et al. |
| 6,575,362 B1 | 6/2003 | Bator et al. | | 2004/0148286 A1 | 7/2004 | Rogers |
| 6,609,113 B1 | 8/2003 | O'Leary et al. | | 2004/0153398 A1 | 8/2004 | Baumgartner et al. |
| RE38,255 E | 9/2003 | Levine et al. | | 2004/0158521 A1 | 8/2004 | Newton et al. |
| 6,615,189 B1 | 9/2003 | Phillips et al. | | 2004/0167860 A1 | 8/2004 | Baxter et al. |
| 6,615,190 B1 | 9/2003 | Slater | | 2004/0193897 A1 | 9/2004 | Van Volkenburgh |
| 6,618,705 B1 | 9/2003 | Wang et al. | | 2004/0210476 A1 | 10/2004 | Blair et al. |
| 6,736,314 B2 | 5/2004 | Cooper et al. | | 2004/0210506 A1 | 10/2004 | Algiene et al. |
| 6,761,309 B2 | 7/2004 | Stoutenburg et al. | | 2004/0210521 A1 | 10/2004 | Crea et al. |
| 6,761,311 B1 | 7/2004 | Algiene et al. | | 2004/0210523 A1 | 10/2004 | Gains et al. |
| 6,814,282 B2 | 11/2004 | Seifert et al. | | 2004/0211831 A1 | 10/2004 | Stoutenburg et al. |
| 6,827,260 B2 | 12/2004 | Stoutenburg et al. | | 2004/0254833 A1 | 12/2004 | Algiene et al. |
| 6,829,588 B1 | 12/2004 | Stoutenburg et al. | | 2005/0017067 A1 | 1/2005 | Seifert et al. |
| 6,847,947 B1 | 1/2005 | Kambour et al. | | 2005/0027650 A1 | 2/2005 | Walker et al. |
| 6,886,742 B2 | 5/2005 | Stoutenburg et al. | | 2005/0167481 A1 | 8/2005 | Hansen et al. |
| 6,908,031 B2 | 6/2005 | Seifert et al. | | 2005/0187929 A1 | 8/2005 | Staggs |
| 6,922,673 B2 | 7/2005 | Karas et al. | | 2005/0180550 A1 | 9/2005 | McGee et al. |
| 6,996,542 B1 | 2/2006 | Landry | | 2005/0209958 A1 | 9/2005 | Michelsen |
| 7,010,512 B1 | 3/2006 | Gillin et al. | | 2005/0209961 A1 | 9/2005 | Michelsen |
| 7,031,939 B1 | 4/2006 | Gallagher et al. | | | | |
| 7,089,208 B1 | 8/2006 | Levchin et al. | | FOREIGN PATENT DOCUMENTS | | |
| 7,376,587 B1 | 5/2008 | Neofytides et al. | | | | |
| 7,644,037 B1 * | 1/2010 | Ostrovsky ............ 705/40 | | EP | 745961 A2 | 7/1998 |
| 2001/0032183 A1 | 10/2001 | Landry et al. | | EP | 745961 A3 | 7/1998 |
| 2001/0042785 A1 | 11/2001 | Walker et al. | | EP | 0949596 A2 | 10/1999 |
| 2001/0051876 A1 | 12/2001 | Seigel et al. | | EP | 1077436 A2 | 2/2001 |
| 2001/0054003 A1 | 12/2001 | Chien et al. | | FR | 2728983 A1 | 7/1996 |
| 2002/0023055 A1 | 2/2002 | Antognini et al. | | GP | 2338814 A | 12/1999 |
| 2002/0046106 A1 | 4/2002 | Ishibashi et al. | | JP | 411025171 A | 3/2006 |
| 2002/0062285 A1 | 5/2002 | Amann | | WO | WO 9626508 A1 | 8/1996 |
| 2002/0082962 A1 | 6/2002 | Farris et al. | | WO | WO 9826386 A1 | 6/1998 |
| 2002/0082987 A1 | 6/2002 | Wilson | | WO | WO 9849644 A1 | 11/1998 |
| 2002/0087462 A1 | 7/2002 | Stoutenburg et al. | | WO | WO 9850875 A2 | 11/1998 |
| 2002/0087463 A1 | 7/2002 | Fitzgerald et al. | | WO | WO 9922291 A1 | 5/1999 |
| 2002/0087467 A1 | 7/2002 | Mascavage et al. | | WO | WO 9928872 A1 | 6/1999 |
| 2002/0104026 A1 | 8/2002 | Barra et al. | | WO | WO 0022559 A1 | 4/2000 |
| | | | | WO | WO 0046725 A1 | 8/2000 |

| | | |
|---|---|---|
| WO | WO 0054122 A2 | 9/2000 |
| WO | WO 0067177 | 11/2000 |
| WO | WO 0079452 | 12/2000 |
| WO | WO 0104816 | 1/2001 |
| WO | WO 0139093 A1 | 5/2001 |
| WO | WO 0205195 A1 | 1/2002 |

OTHER PUBLICATIONS

About Western Union: Company History; http://www.payment-solutions.com/history.html, 2005, 2 pages.
Aeromexico and Western Union Partner to Offer a Cash Payment Option for Booking Airline Tickets; 2004, Press Release, 2 pages.
American Express in New Ad Drive; 1990, American Banker, 1 page.
American Express Introduces Automated Money Order Dispenser; 1991, Professional Check Casher, 1 page.
American Express Money Orders, Travelers Cheques Now on Sale; 1936, Dots and Dashes, 2 pages.
American Express Unit Introduces State-Of-The-Art Automated Money Order Dispenser; 1990, Tri-State Food News, 1 page.
American Greeting Cards Click-Through; no date, 38 pages.
Amerinet, Inc., "Debit-It!—The Best Idea in Payment Systems Since the Credit Card", downloaded from website http://www.debit-it.com/ on Feb. 7, 2000, 8 pages.
Amex aims expansion strategy at local currency exchanges; 1990, Crain's Chicago Business, 1 page.
Amex Money Order Dispenser; 1990, The Nilson Report, 1 page.
Amex tests Moneygram; 1990, Adnews, 1 page.
And a Nine—Second Money Order Dispenser; 1991, Post-News, vol. 17, No. 1, 1 page.
Announcing Quick Collect Online; 2002, Western Union's Professional Collector, 3 pages.
Annual Report of First Data Corporation; 1998, 3 pages
Annual Report of First Data Corporation; 1999, 2 pages.
Annual Report of the President of the Western Union Telegraph Company; 1873, pp. 8-11.
Annual Report of the President of the Western Union Telegraph Company; 1874, pp. 8-11.
Annual Report of the Western Union Corporation; 1990, 4 pages.
Annual Report of the Western Union Telegraph Company; 1935, 2 pages.
Annual Report of the Western Union Telegraph Company; 1940, pp. 9 and 22.
Annual Report of the Western Union Telegraph Company; 1947, 2 pages.
Annual Report of the Western Union Telegraph Company; 1949, 2 pages.
Annual Report of the Western Union Telegraph Company; 1951, 2 pages.
Annual Report of the Western Union Telegraph Company; 1953, 2 pages.
Annual Report of the Western Union Telegraph Company; 1954, 3 pages.
Annual Report of the Western Union Telegraph Company; 1973, 5 pages.
Annual Report of the Western Union Telegraph Company; 1974, 2 pages.
Annual Report of the Western Union Telegraph Company; 1978, 2 pages.
Annual Report of the Western Union Telegraph Company; 1981, 2 pages.
Arthas Corp., dotBank, The Way to Send and Receive Money on the Internet, downloaded from website dotbank.com on Feb. 7, 2000.
At&T Wireless to Offer Western Union SwiftPay as Replenishment Option for AT&T Free2Go Wireless Prepaid Customers; 2001, PR Newswire Association, 2 pages.
Author Unknown "Online Payment Services" www.auctionbytes.com/cab/pages/payment, compiled Nov. 2002, 3 pages.
Behind the Scenes of Life; 1996, First Data Corporation Annual Report, 3 pages.
Bidpay.com: Whois search results; 2003, http://www.networksolutions.com/en_US/whois/results.jhtml;jsessionid+VZDZVYDD1J, 2 pages.
BidPay: Seller FAQs—Receiving Payments and Using the Money Order Service; 1999-2003, 7 pages.
billserv.com Launches bills.com, an internet Portal for Consumers to Pay All Bills Online at No Cost; 2000, Business Wire, 2 pages.
Boneh, Dan "Beaming Money by Email is Web's Next killer App", PR Newswire, Nov. 16, 1999, pp. 1-4.
Bowen, Cathy, "Behind the Spree in Payments for C2C", Credit Card Management, New York: Apr. 2000, vol. 13, Issue 1, p. 28, 8 pages.
Business Wire, "E-Commerce, Email and E-greeting Cards Combine in New Web Site Designed by Interactive Bureau", Sep. 14, 1999 (abstract), [online] [retrieved on May 1, 2002], retrieved from PROQUEST Database, 2 pages.
Business Wire, "G&D America's Multi Application Smart Card Selected for Combined Payroll and 'Virtual Banking' Program in Mexico," Apr. 24, 1998, 4 pages.
Candygram payment service, no date, 1 page.
Card News; "Now E-Mail Payments from Your Palm Pilot", Dec. 1, 1999; v14, n23, p. 1.
CES/NaBANCO Introduces Stored Value Card Technology: Blockbuster Video is First Merchant Partner; 1996, First Data Corporation News Release, 3 pages.
Collect your delinquent accounts by Telegraph; 1933, Form 1229-A, 1 page.
Collection by Money Transfer: MoneyGram Service Removes Time-Consuming Steps to Commercial Collections; 1990, Collector, p. 36.
Common Values: Uncommon Opportunities; 1995, First Data Corporation Annual Report, 2 pages.
Company Profile: The Western Union Convenience Pay Service; 2004, 4 pages.
Confinity, Inc., PayPal.com, How PayPal.com Works, download from website http://www.paypal.com on Feb. 7, 2000, 7 pages.
Dotbank, "The Way to Send and Receive Money on the Internet," download from website http://www.dotbank.com, Feb. 7, 2000, 6 pages.
Dots and Dashes; 1935, vol. 11, No. 9, 4 pages.
FDR to Offer HNC Software's Real-Time Fraud Detection: New distribution Agreement to Benefit Card Banks; 1996, First Data Resources News Release, 3 pages.
Federal Benefits Checks are Going Away—Don't Let Your Customers Go with Them: Announcing the Western Union Benefits Quick Cash Program; 4 pages.
First Data Acquires PaySys International; 2001, Press Release, 2 pages.
First Data Aligns with CyberCash to Offer New Electronic Coin Service; 1996, First Data Corporation News Release, 3 pages.
First Data and Netscape Announce Program to Help Businesses Establish Payment-Enabled Web Sites; 1996, First Data Corporation News Release, 5 pages.
First Data and Netscape Offering Internet Payment Processing Service; 1996, First Data Corporation News Release, 3 pages.
First Data InfoSource Offers Database Analysis with DecisionScope; 1996, First Data Corporation News Release, 2 pages.
First Data to Offer Card Profitability Software from HNC: Distribution Agreement Poised to Repeat Falcon Success;1996, HNC Software, Inc. News Release, 3 pages.
First Data, First USA Paymentech, GE Capital Invest in First Virtual Holdings; 1996, First Virtual Holdings Corporation News Release, 3 pages.
First located example of a money transfer; Aug. 25, 1873, 1 page.
Gardyne, Allan, "Introducing Paypal: Paypal—The electronic money transfer system"; Dec. 9, 1999; http://www.associateprograms.com/articles/385/1/Introducing-PayPal; pp. 1-3.
Get your Collect Card; 1939, Dots and Dashes, 2 pages.
Gift: Money Order for something you really want: 1933, 1 page.
Guess What? The check's not in the mail; 2001, Western Union's Professional Collector, 3 pages.
Hoffman, Karen Epper "PayPal Still Running Free, But the e-payments company's carefree days may be numbered if regulators decide it's essentially a bank" Bank Technology News, published between 2001-2003, www.banktechnews.com/btn/articles/btnoct01-13.shtml, 3 pages.
Holiday Greeting by Western Union; 1933, 1 page.

How money by phone was paid;; Money Transfer Service: Book of Rules and List of Offices; 1926, Western Union Telegraph Company, 3 pages.

Idealab Company, "PayMe.com," download from website http://ssl.idealab.com on Feb. 16, 2000, 7 pages.

If you're not getting your payment with Quick Collect, chances are you're not getting it; 2001, 2 pages.

Intell-A-Check Corp.: "Intell-A-Check!—The Way to get Paid", Intell-A-Check product overview, retrieved from http://www.icheck.com/ on Feb. 7, 2000, 7 pages.

Introducing the Western Union Cash Card Program; 1998, 2 pages.

It takes a certain person to make a good collector. But it takes a good manager to make a champion; 2001, Western Union's Professional Collector, 3 pages.

Karpinski, R., "Web Merchants try Debit Cards and Gift Certificates to Spur Sales," InternetWeek, Oct. 11, 1999, 2 pages.

Lan Airline Alliance Carriers and Western Union Offer Travelers Additional Payment Options; 2005, 3 pages.

Large, Jack, "Connect Now With Electronic Commerce," Corporate Finance, London, Jul. 1998, Issue 164.

Last of the Pony Express Riders Tells His Story; 1932, Dots and Dashes, vol. 8, No. 10, 2 pages.

Latour, Almar "PayPal Electronic Plan May be on the Money in Years to Come", The Wall Street Journal Interactive Edition, Nov. 15, 1999, downloaded from www.paypal.com/html/wsj.html, 2 pages.

Lawton, George; "Biometrics: A New Era in Security"; 1998, Computer, vol. 31, No. 8, pp. 16-18.

Leading Provider of Transaction Card Processing Selects Connect Oneserver Software as a Solution for Advanced Internet Merchant Services: First Data Chooses OneServer as an Application to Deliver the Internet to Banks and Merchants; 1996, press Release, 4 pages.

List of Prepaid Services; http://www.westernunion.com/info/osComparePrePaid.asp, 1 page.

Loved one stranded? Send Cash; 1991, Akron Beacon Journal, 2 pages.

Luxury Brands LLC: World Famous Brands at Liquidation Proces; http://www.auctionbytes.com/cab/pages/payment, 3 pages.

Messenger Work Full of Adventure, Excitement; 1933, Dots and Dashes, vol. 9, No. 11, 2 pages.

Money Order with confirmation; 1948, 1 page.

Money Orders by Phone; 1935, Fortune Magazine, 3 pages.

Money-wire giants battle for business: Currency exchanges wooed; 1991, Chicago Sun Times, 2 pages.

MoneyZap.com Greeting Card Process Flow; 2000, 2 pages.

Nation Receives Time Over Western Union Network; 1931, Dots and Dashes, vol. 7, No. 5, 2 pages.

Nationwide Credit Collectors Act Globally; 2001, Western Union's Professional Collector, 3 pages.

Netscape Announces Netscape Livepayment to Facilitate Internet Commerce; 1996, Netscape News Release, 4 pages.

New commercial services from Western Union allow businesses to directly transfer money internationally; User companies can now send or receive money at their own offices through on-line connection to world's largest international money transfer network.

New Western Union SwiftPay Service Continues Expansion of Consumer-to-Business Payment Options; 1999, PR Newswire Association, 2 pages.

NTS Completes Merger with EDS Fleet Services; New First Data Unit Sets Sights on New Markets; 1996, NTS Press Release, 3 pages.

Only Western Union, no date, 2 pages.

PayPal for the Palm; http://handheldnews.com/file.asp?ObjectID=5401, Printed date Oct. 10, 2003; 2 pages.

PayPal.com Case Study; http://fox.rollins.edu/~slackman/PayPal.htm, 2003, 7 pages.

PayPal: The way to send and receive money online; 2002; 4 pages.

PayPal-News; http://www.andrys.com/paypal.html, 2003, 3 pages.

PaySys—company overview, no date, 2 pages.

PaySys signs up four Asian distributors; 1997 Orlando Business Journal, 3 pages.

Picture of Bill payment form or advertisement, no date, 1 page.

Pilgrims Started Thanksgiving Custom; Dots and Dashes, vol. 4, No. 11, Nov. 1928, 2 pages.

Plotkin, Hal "Beam Me Up Some Cash" Silicon Valley Insider, Sep. 8, 1999, www.halplotkin.com/cnbcs029.htm, 3 pages.

PR Newswire, "GiftSpot.com Simplifies Gift-Giving on the Internet," Oct. 20, 1999(abstract), [online] retrieved on May 1, 2002], retrieved from PROQUEST Database, 5 pages.

Press Release: "Western Union Announces ATM Card Payout for Money Transfer Transactions"; 2001, URL: http://news.firstdata.com/media/ReleaseDetail.cfm?ReleaseID=849995>.

Press Release: "Western Union Announces ATM Card Payout for Money Transfer Transactions"; 2001, URL: http://news.firstdata.com/media/ReleaseDetail.cfm?ReleaseID=849995>.

Products and Services for PaySys, no date, 2 pages.

Purchasing American Airlines Tickets Just Got Easier; 2005, 4 pages.

Quick Cash and Quick Collect: Western Union's money-movers; 1990, Newsbriefs, vol. 2, No. 1, 3 pages.

Quick Cash: A safe and reliable way to send funds around the world; http://www.payment-solutions.com/quickcash.html, 1 page.

Quick Collect Sales Presentation; Jan. 2004, 28 pages.

Quick Collect: Government/Child Support Agency Name, Training Guide; 2004, 7 pages.

Quick Collect; Western Union Training Guide; 2004, 10 pages.

Quick Pay: The Convenient and reliable way to receive payments from customers worldwide; http://www.payment-solutions.com/quickpay.html, 2005, 3 pages.

Radecki, Lawrence et al., "Paying Electronic Bills Electronically,". Current Issues in Economics and Finance. vol. 5, No. 1, Jan. 1999.

Refund of Money Transfers; 1913, Journal of the Telegraph, 2 pages.

Remittance for order sent via Western Union; 1933, 2 pages.

Reynolds Arcade was Western Union Birthplace; 1933, Dots and Dashes, vol. 9, No. 8, 2 pages.

Rhode Island becomes first state to accept child support payments at Western Union: Government Payment Leader govONE Solutions Adds Walk-in to Full Suite of Payment Options; 2002, 3 pages.

Rhode Island becomes first state to accept child support payments at Western Union: More than 50 Western Union Convenience Pay Agent Locations Offer New Level of Convenience to Rhode Island Residents Who Pay Child Support—; 2002, 3 pages.

Russo, E., "Omaha's Giftpoint.com Draws $5 Million Investment," Omaha World, Dec. 14, 1999, 2 pages.

SBC Communications adds Western Union Locations for Walk-in Customer Bill Payments; SBC News Release, Sep. 7, 2005, 2 pages.

Send your payment using Western Union Quick Collect; Feb. 2, 2004 2 pages.

Send Your Utility Bill Payment from Here!; no date 3 pages.

Sending Cash in a Flash; 1990, Travel & Leisure, p. 42.

Sending Cash in a Flash: There are more ways to do it than you might think; 1991, 2 pages.

Shopping Order by Western Union, 1933, 1 page.

Shopping Order service and gift service; 1934, Western Union Telegraph Company, Money Order Book, 6 pages.

Signature Services: Helping financial institutions send funds faster; http://www.payment-solutions.com/signature.html, 205, 1 page.

State of Hawaii to Accept Child Support Payments at Western Union; 2004, 2 pages.

State of New York Banking Department: Staff Letters and Memoranda; 2000, http://www.banking.state.ny.us/Io000718.htm, 2 pages.

Steiner, Ina "PayPal Online Payment Service—Another Way to Pay for Auction Items" www.auctionbytes.com, Feb. 20, 2000, 4 pages.

Steiner, Ina: "Accepting Credit Cards When You Sell Items: ProPay and Billpoint Payment Services"; 2000 Auction Bytes, 4 pages.

Steiner, Ina: "BidPay.com Offers Click and Pay Service for buyers"; 2000, Auction Bytes, 4 pages.

Steiner, Ina: "Follow-up to BidPay Article"; 2000, Auction Bytes, 3 pages.

Stockel, Anna; "Securing Data and Financial Transactions"; 1995, Institute of Electrical and Electronics Engineers 29th Annual Conference, pp. 397-401.

Strean, LitleNet, BBN, and KPMG Announce Industry-Wide Initiative to Enable Wide-Scale Software Electronic Commerce; 1996, News Release, 6 pages.

Survey of services; 1960, pp. 2-31.

TeleCheck International, Inc.: "Making Checks Our Responsibility", retrieved from http://www.telecheck.com/home/home.html on Feb. 7, 2000, 8 pages.
The Western Union Telegraph Company: Delivery Department Instructions; 1926, Commercial Bulletin No. 9-A, 2 pages.
The Western Union Telegraph Company: Instructions for Receiving Clerks; 1929, Commercial Bulletin No. 37-A, 2 pages.
The Western Union Telegraph Company: Rules for Money Transfer Service; 1908, pp. 3-25.
The Yellow Blank is Correct for every social need; 1930, Western Union Booklet, 2 pages.
The Yellow Blank: When, Why, How to Use It; 1934, 5 pages.
To send a Quick Collect Payment; sample form, no date, 1 page.
Transfers require ID made by telegraph; 1895, Tariff Book, 4 pages.
Transpoint, "The Way to Pay Online", downloaded from website http://www.transpoint.com/ on Feb. 10, 2000, 12 pages.
Tranz 330 Fast, "Low-Cost Transaction Automation At The Point of Service," http://www.vfi-finance.com/tranz330.htm, VeriForne Finance, pp. 1-3, especially pp. 1-2, Jan. 1999.
VIPS Introduces MCSource to Managed Healthcare Industry; 1996, VIPS Healthcare Information Systems News Release, 2 pages.
VisionPLUS Consumer Payment Solution Overview, no date, 2 pages.
Walker, L., "Click a Card", The Washington Post, Dec. 16, 1999, 3 pages.
Website "eCount" at http://www.ecount.com, 15 pgs.
Website: "Billpoint" at http://www.billpoint.com, 24 pgs.
Website: "eMoneyMail" at http://www.emoneymail.com, 16 pgs.
Website: "I-Escrow" at http://www.iescrow.com, 12 pgs.
Website: "PayMe" at http://www.payme.com, 14 pgs.
Website: "PayMyBills.com" at http://www.paymybills.com.
Website: "PayPal" at http://www.paypal.com, 19 pgs.
Website: "Tradesafe.com" at http://www.tradesafe.com, 18 pgs.
Weitzman, Jennifer, "Star Trek Promise Fulfilled: Wireless Cash Transfer. (Confinity, Inc.'s PayPal.com service)", Dec. 9, 1999, American Banker, V164, n235, pp. 1-2.
Wermer, Sandra; "A million credit card transactions in five hours"; 1997, Primeur, 2 pages.
Western Union—Now, using our service is even more rewarding; no date, 4 pages.
Western Union—Some Quick Facts about Quick Collect; no date, p. 1.
Western Union and Continental Airlines Introduce New Quick and Easy Cash Payment Option When Booking Flights; 2004, Press Release, 4 pages.
Western Union—BidPay-Buyer FAQs, 1999-2003, 7 pages.
Western Union Creates Phone Card with BLT Technologies; 1997, PR Newswire Association, 2 pages.
Western Union Credit Card; 1915, 4 pages.
Western Union Domestic Transfer Order, Form 72-A, 1933, 1 page.
Western Union Financial Services Inc.: There's a lot to be said about the many advantages of the Quick Collect service. And look who's saying it; 1995, 4 pages.
Western Union Financial Services, Inc.: Benefits Quick Cash Agreement and Disclosure Statement; 1998, 2 pages.
Western Union Financial Services, Inc.: Cash Card Agreement and Disclosure Statement; 1998, 2 pages.
Western Union Foreign Transfer Order, Form 72-A, 1933, 1 page.
Western Union Gift Greetings; no date, 6 pages.
Western Union Gift Orders: A Practical Answer to the Christmas Gift Problem, 1933, 1 page.
Western Union Gift Orders: The Sensible, Convenient Way to take care of your Christmas Shopping; 1933, 1 page.
Western Union Hotel-Motel Reservation Service, no date, 1 page.
Western Union Money Orders More Popular Than Ever: 1942, Dots and Dashes, vol. 18, No. 3, 2 pages.
Western Union Money Transfer Services, Send Money Online, Money Orders, Send Telegrams; http://www.westernunion.com/info/osCompareMoneyMessage.asp, 2005, 3 pages.
Western Union Money Transfer, Form 72-A, 1933, 1 page.
Western Union New Supplement: Money Orders delivery through Mailgram: 1975, 2 pages.
Western Union News Supplement: Automatic travelers checks using Western Union; 1975, 2 pages.
Western Union Payment Services, Bidpay and Quick Collect, Online Bill Payment, Online Auction Payments; http://www.westernunion.com/info/osComparePayment.asp, 2005, 2 pages.
Western Union Products and Services: a brief description; 1960, 22 pages.
Western Union Quick Collect: First Data Corporation; 2000-2001,2004; 2 pages.
Western Union Quick Collect: The Fastest way to collect good funds; 1999, 11 pages.
Western Union Quick Collect: The most agents, the most locations, the most experienced; 2000, 2 pages.
Western Union Quick Collect; 3 Easy Ways to Send a Payment: In Person, Online or by Phone!; no date, 2 pages.
Western Union Shopping Order, 1933, 2 pages.
Western Union SwiftPay Selected by Sheakley Uniservice to Complete W-2 Reprint Transactions; 2000, PR Newswire Association, 2 pages.
Western Union Telegraph Company; 1933, Money Order Message, 17 pages.
Western Union/Money Zap: Send and receive money easily over the internet; http://www.moneyzap.com/main.asp, printed Dec. 1, 2000, 23 pages.
Western Union's Would-Be Rival; 1990, American Banker, 1 page.
When you're helping a customer make a crucial payment there's no room for guesswork; 2002, Western Union's Professional Collector, 3 pages.
Why Send Your Customers Across Town When You Can Send Them Next Door? 2005, 1 page.
Wijnen, Rene "You've Got Money!", Bank Technology News, Jun. 2000, pp. 1-4, vol. 13, Issue 6, New York.
x.com, "Do More with Your Money," download from website http://www.x.com., 5 pages, Feb. 7, 2000.
You're sending more than a payment: Point-of-Sale & Merchandising Support Advertising Materials, no date, 2 pages.
You're sending more than a payment: You're sending peace of mind; 2004, 3 pages.

* cited by examiner

`US 7,937,292 B2`

WIDE AREA NETWORK PERSON-TO-PERSON PAYMENT

CROSS-REFERENCES TO RELATED APPLICATIONS

This application claims priority to and is a divisional of U.S. patent application Ser. No. 10/332,724, filed Sep. 12, 2003, now U.S. Pat. No. 7,606,734 entitled "WIDE AREA NETWORK PERSON-TO-PERSON PAYMENT," which is a national phase entry of international patent application Ser. No. PCT/US2001/022179, filed Jul. 11, 2001, entitled "WIDE AREA NETWORK PERSON-TO-PERSON PAYMENT." International patent application Ser. No. PCT/US2001/022179 claims the priority benefit of U.S. provisional patent application Ser. No. 60/256,127, filed Dec. 15, 2000, entitled "ELECTRONIC GIFT GREETING," and also claims the priority benefit and is a continuation-in-part of U.S. patent application Ser. No. 09/613,615, filed Jul. 11, 2000, now U.S. Pat. No. 7,376,587 entitled "METHOD FOR ENABLING TRANSFER OF FUNDS THROUGH A COMPUTER NETWORK."

BACKGROUND

The invention relates generally to computer-implemented financial transactions, and more particularly relates to processing person-to-person payments and money requests using a computer network.

One individual (the payor) may wish to pay money to another individual (the payee) for any of a variety of reasons. Frequently, the payor owes a debt to the payee. The debt may be an informal IOU or a more formal transaction. Other times, the payor may wish to give the money to the payee as a gift.

Until now, individual payors have typically completed such payments via cash or paper check. More convenient payment methods exist, such as credit cards and bank account debits through electronic fund transactions, however, the payor typically does not have the option to use these other payment methods when the payee is an individual as opposed to a retail business that has been pre-established as an online merchant. Thus, there is a need in the art for enabling individuals to use more convenient money transfer methods.

For individuals who participate in frequent money transfers to or from other individuals, managing all these money transfers is also inconvenient. For example, a payor may receive requests for money from multiple payees through different communication methods, including in person, over the phone, and in writing. Keeping track of requests for money is therefore time consuming. Likewise, the payee is often not sure of the best way to notify the payor of a money request. Accordingly, there is a need in the art for a convenient method by which a payee can request money from a payor.

Furthermore, a payor may desire to initiate a particular money transfer at a future time. This may be the case with a birthday gift of money or a debt that is not due until a later date. If the payor attempts to wait until the intended transfer date to give the payee a check or cash, however, the payor runs the risk that the payor will either forget or not have the opportunity to give the check or cash to the payee. This problem is particularly cumbersome when the payor must make recurring payments of a fixed amount, such as for rent in an apartment. Therefore, there is also a need in the art for a mechanism for scheduling future payments that the payor does not want to initiate until a later time. In general, there is a need in the art for safe and convenient methods by which individuals can engage in money transfers.

BRIEF DESCRIPTION OF THE DRAWINGS

The present invention is described in conjunction with the appended figures.

Figure 1A:
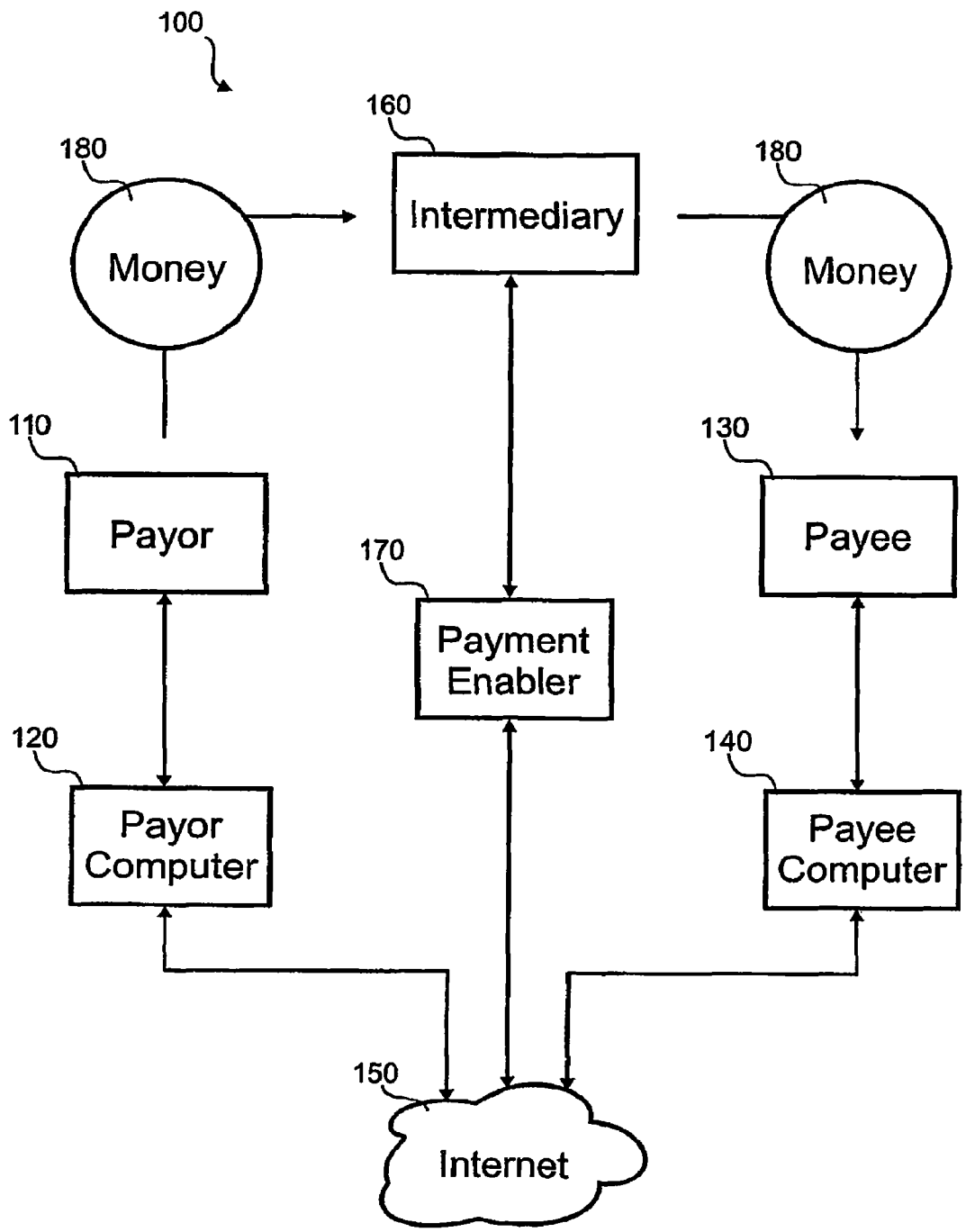
FIG. 1A is a block diagram of an overview of person-to-person payments in accordance with an exemplary embodiment of the present invention.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

The present invention processes person-to-person payment commands and money requests received from over a computer network such as the Internet. The payment enabler allows a remote individual to register for an account through which the individual can make payments to other individuals, request money from other individuals, and access other functionality to facilitate the management of the individual's financial transactions.

In addition to initiating immediate money transfer and request money transactions, an individual may use the payment enabler to schedule future or recurring transactions to one or more payees. Where there are multiple payees, each payee may receive the same amount or a differing amount.

At the time an individual authorizes a payment to another person or directs the payment enabler to request money from another person, the person to whom the payment or money request is directed may, but need not, have already registered for an account with the payment enabler. Where the payment is to an unregistered payee, the payment may be in the form of a gift certificate, an electronic gift certificate, a money order, a check, a savings bond, an airline mileage credit, or negotiable instrument sent to the payee who would never need to register in order to receive the payment. When communicating with individuals, the payment enabler may use both mail, telegrams, telephone, pages, instant messaging, Web pages and/or e-mail.

An intermediary typically operates the payment enabler and acts as a conduit for the money transfer from one individual (the payor) to another individual (the payee). This enables the payor to pay through a variety of different payment methods and the payee to receive payment through a variety of different methods. Individuals, by way of the intermediary, may make payments from and receive money transfers into a stored value account.

Address book functionality provides users the ability to retain information on counter parties. The address book may be integrated into the money transfer and money request interfaces to allow an individual to quickly select the counter party for a transaction. The individuals in the address book may be manually entered or automatically entered as a previous counter party.

Generally described, the present invention comprises a method for providing a person-to-person payment service through a computer server of a computer network. The computer server maintains a database of e-mail addresses corresponding to individuals having accounts that provide the individuals with functionality offered by the computer server for online management of financial transactions. The computer server receives from a first individual located at a remote computer an e-mail address of a second individual to whom the first individual wants to send an amount of money. Then, the computer server searches the database of e-mail addresses for the e-mail address of the second individual. If the e-mail address of the second individual is found in the database of e-mail addresses, then the payment of the amount of money from the first individual to the second individual is completed.

To complete the payment of the amount of money from the first individual to the second individual, the computer server may first initiate a transfer of the amount of money from the first individual to a first intermediary bank account using a first money transfer method. The computer server then transfers the amount of money from a second intermediary bank account to the second individual using a second money transfer method.

The present invention also comprises a method for providing a money request service through a computer server of a computer network. The computer server maintains a database of e-mail addresses or other unique identifier corresponding to individuals having accounts that provide the individuals with functionality offered by the computer server for online management of financial transactions. The computer server then receives from a first individual located at a remote computer an e-mail address of a second individual from whom the first individual wants to request an amount of money. The computer server sends an email to the e-mail address of the second individual to notify the second individual that the first individual is requesting the amount of money. The computer server then receives authorization from the second individual to pay the amount of money to the first individual. The computer server next completes a payment of the amount of money from the second individual to the first individual.

The present invention is typically embodied in a server, called a payment enabler, that processes person-to-person payment commands and money requests received from over a computer network such as the Internet. The payment enabler allows an individual to register for an account through which the individual can make payments to other individuals, request money from other individuals, and access other functionality to facilitate the management of the individual's financial transactions. The payment enabler may, for example, provide the user of an account with access to online statements listing the user's pending and history (past) transactions.

To communicate with individuals, the payment enabler may use both Web pages and e-mail. Web pages may allow the payment enabler to both communicate information to and receive information from an individual. E-mail provides a convenient mechanism through which the payment enabler can reach individuals who have not registered with the payment enabler and update individuals about the status of a particular transaction.

At the time an individual authorizes a payment to another person or directs the payment enabler to request money from another person, the person to whom the payment or money request is directed may, but need not, have already registered for an account with the payment enabler. If the person to whom the payment or money request is directed does not already have an account with the payment enabler, then the payment enabler e-mails that person to invite his or her registration for an account so that the transaction can be completed.

An intermediary typically operates the payment enabler and acts as a conduit for the money transfer from one individual (the payor) to another individual (the payee). This enables the payor to pay through a variety of different payment methods and the payee to receive payment through a variety of different money receipt methods.

For example, individuals may make payments from and receive money transfers into a stored value account, also called a virtual private payment account. The stored value account holds payment credit that is deducted as portions of that credit is transferred to payees. Where the payee also has an account with the payment enabler, payment passes from the payor's stored value account to the payee's stored value account. The individual may have a physical card associated with the stored value account. Using the card, the individual may make payments to brick-and-mortar stores by drawing upon funds in the stored value account.

Some embodiments may automatically sweep credits from a stored value account out to the individual associated with the stored value account. Credits may accumulated in an individual's stored value account over time. Periods or thresholds can be configured that automatically cause a transfer of credits out of the stored value account. For example, every month the credits could be swept into a banking account or when the credit balance exceeds $1000 a money order could be mailed to the individual.

In addition to initiating immediate money transfer and request money transactions, an individual may use the payment enabler to schedule a future or recurring payment or money request to another individual. An individual may schedule the dates for a future or recurring transaction via selection from a pull-down menu, typing in the dates, selecting dates by clicking on them in a graphical calendar interface, and the like. For a recurring transaction, the individual may use any of the above methods to specify a date to make the initial payment or money request and then specify a frequency and duration for repeating the payment or request.

Address book functionality may provide users the ability to retain information on counter parties. The address book may be integrated into the money transfer and money request interfaces to allow an individual to select quickly the counter party for a transaction.

Under some circumstances, the payee of a transaction may receive a customary greeting card as part of the same transaction. An electronic greeting card would include a link to the payment enabler that would allow receiving a payment from the donor/payor. The payment could be in the form of a gift certificate that is redeemable at one or more Internet or bricks-n-mortar retailers. Some embodiments, could allow on-line selection of a greeting card that is printed and sent along with a money order, gift certificate, check, or negotiable instrument.

Although the present invention has thus far been described in the context of transactions between individuals, one skilled in the art should appreciate that the methods described in the detailed description can also apply to transactions where one or both of the parties is another type of entity, such a business, merchant, corporation, group, or the like. Moreover, an individual may command the payment enabler to make a payment to several different individuals in a single transaction. Likewise, an individual may instruct the payment enabler to request money on the individual's behalf from several other people in a single transaction.

Person-to-Person Payment Overview

FIG. 1A provides an overview 100 of person-to-person payments according to an exemplary embodiment of the present invention. The overview 100 illustrates a payor 110 who needs to transfer an amount of money (also called a payment) 180 to a payee 130.

The payment enabler 170 is typically hosted by a server linked to a computer network such as the Internet 150. Accordingly, the payment enabler 170 is accessible over the Internet 150 by individuals (e.g., the payor 110 and the payee 130) located at computers (e.g., the computers 120 and 140) that are remote from the payment enabler 170. The payment enabler 170 enables these individuals 110, 130 to register for an account with which they can make payments to other individuals, request money from other individuals, and access other functionality to facilitate the management of the individuals' financial transactions.

The payor 110 typically accesses the Internet 150 through the payor computer 120, and the payee 130 typically accesses the Internet 150 through the payee computer 140. The payor computer 120 and the payee computer 140 may be linked to the Internet 150 in the customary manner. To enable the payor 110 and the payee 130 to access the functionality of the various servers connected to the Internet 150, the payor computer 120 and the payee computer 140 typically run a Web browser that enables their users to communicate with these various servers through Web pages. The payor 110 and the payee 130 may also access the payment enabler 170 in this manner. Other computer users (not shown) may access the Internet 150 and the payment enabler 170 in a similar manner.

Using the payment enabler 170, the payor 110 may complete a money transfer of a payment 180 to the payee 130. In such a transaction, an intermediary 160 may act as a conduit for the money transfer of the amount 180. Typically, the intermediary 160 is a business that operates the payment enabler 170. By acting as a conduit for a money transfer between the payor 110 and the payee 130, the intermediary 160 enables the payor to pay through a variety of different payment methods and the payee to receive payment through a variety of different money receipt methods. As shown in the overview 100, the intermediary 160 collects the payment 180 from the payor 110—via a first money transfer method, and the intermediary transfers the payment to the payee 130 via a second money transfer method.

Typically, the intermediary 160 receives the transfer of money 180 via the first money transfer method into a first bank account. The intermediary 160 typically transfers money 180 from a second bank account to the payee 130 via the second money transfer method. The first bank account and the second bank account may, but need not, be the same account.

Although the intermediary 160 may receive the payment 180 from the payor 110 before the intermediary transfers the payment to the payee 130, the intermediary may choose to pay the payee before receiving payment from the payor. In this case, the intermediary 160 assumes the risk of nonpayment by the payor 110. Instead of assuming the risk of nonpayment in order to pay the payee 130 before receiving payment 180 from the payor 110, the intermediary 160 may pay a third party (not shown) to assume the risk of nonpayment by the payor.

Those skilled in the art will be familiar with a variety of money transfer methods. The first money transfer method from the payor 110 to the intermediary 160 may comprise such payment methods as receiving a deposit of an amount of cash by the payor at the store of a payment processor that transfers the amount to the intermediary, debiting a credit card of the payor, debiting a bank account of the payor in an electronic find transaction, debiting a stored value account (also called a virtual private payment account) of the payor, receiving a paper check from the payor, and the like. The second money transfer method from the intermediary 160 to the payee 130 may comprise such money receipt methods as debiting a bank account of the intermediary to fund the dispensing of cash to the payee through an automated teller machine (ATM), dispensing cash to the payee at a store of a payment processor that funds the transaction by debiting a bank account of the intermediary, crediting a credit card of the payee, crediting a bank account of the payee in an electronic fund transaction, crediting a stored value account of the payee, sending a paper check to the payee, and the like.

By way of further explanation, a stored value account may have a balance that can be credited and debited. A business managing the stored value account typically guarantees the account owner the ability to convert the account balance to cash or cash-equivalents through withdrawals or payments to other entities made against the account balance. For the account owner to make a payment to an entity or individual against the balance in a stored value account, that entity typically arranges to accept payment from the business managing the stored value account prior to the transaction. When the business managing the stored value account receives money on the behalf of the account owner, the balance of the account owner's stored value account is credited. In some embodiments, the business managing the stored value account is the same business running the payment enabler.

The transfer of money 180 via the first money transfer method and/or the second money transfer method may be executed using money transfer processing systems (not shown) that are managed by the intermediary 160. Alternatively, either or both of these transfers may be executed using money transfer processing systems (not shown) of third parties. To direct a money transfer processing system to perform a money transfer and provide it with the appropriate transaction details, the payment enabler 170 may communicate with the processing system over the Internet 150, over dedicated network connections, or through other means. The details of money transfer processing systems for various payment methods and money receipt methods are well known to those skilled in the art.

Figure 1B:
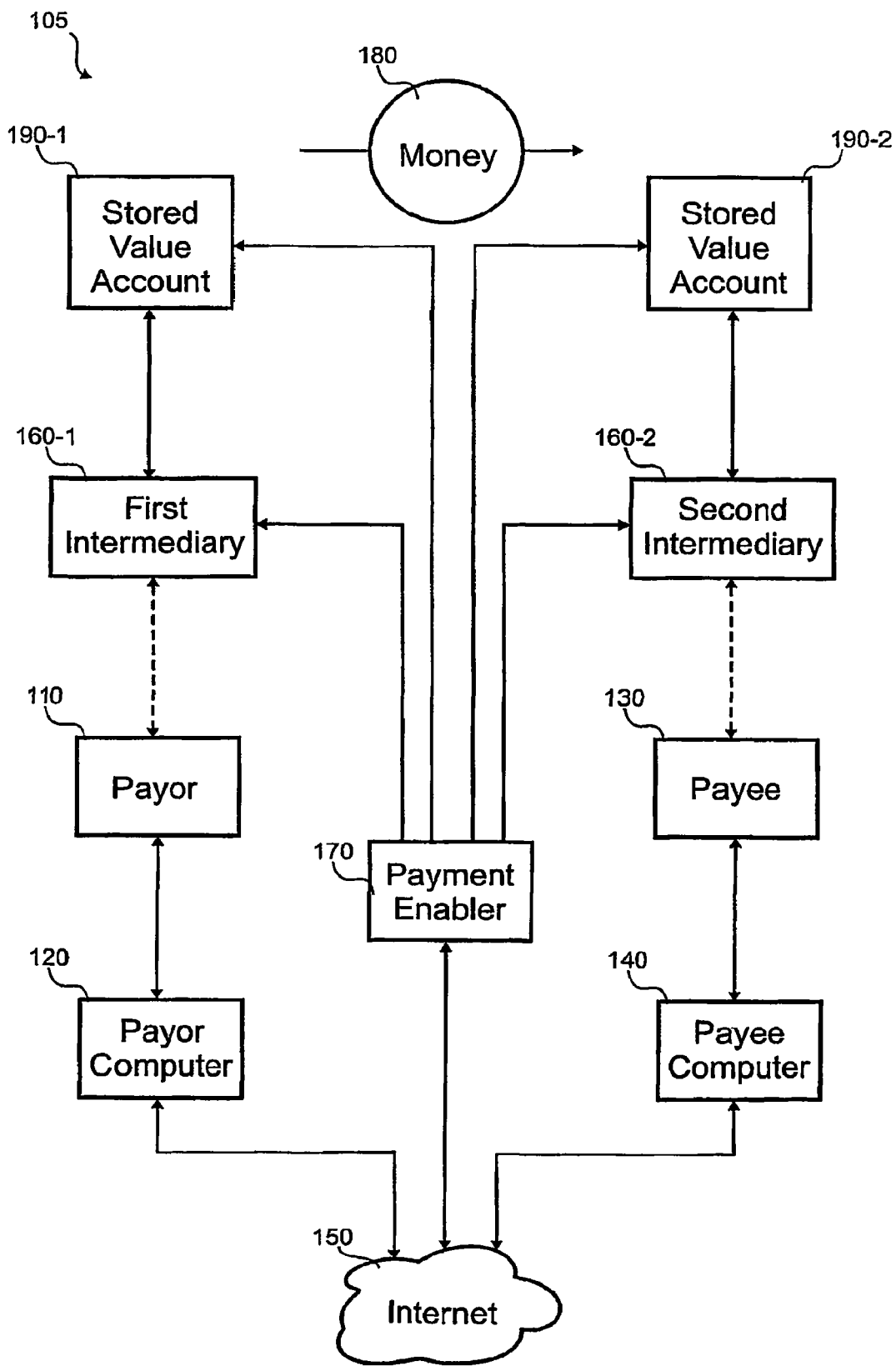
FIG. 1B is a block diagram of an overview of person-to-person payments in accordance with another embodiment of the present invention.

With reference to FIG. 1B, a block diagram of a system 105 for person-to-person payments in accordance with another embodiment of the present invention is shown. In this embodiment, both the payor and payee 110, 130 have respective stored value accounts 190.

Although only one intermediary 190-1 is shown in FIG. 1B for the payor 110, the payor 110 configures any number of intermediaries 160 to send payment credits to and/or receive payment credits from the payor's stored value account 190-1. The stored value account 190-1 may be receive credits from other individuals or from any of the intermediaries 160 at the request of the payor or as credits are needed.

When a transaction is initiated, the payor's stored value account 190-1 receives credits from a selected first intermediary 160 under the direction of the payment enabler 170 such that sufficient credits are present to fund the transaction. The payment 180 passes from the payor's stored value account 190-1 to the payee's stored value account 190-2 as controlled by the payment enabler 170. The payee 130 is notified with e-mail, for example, of the new credit to the stored value account 190-2. With the assistance of a second intermediary 160-2 under direction from the payment enabler 170, the credit can be withdrawn by the payee 130. Although only one second intermediary 160-2 is shown, any number of intermediaries may be possible to transfer all or part of the credit from the stored value account 190-2 of the payee.

The above embodiment credits the payor's 110 stored value account 190-1 before transferring the credit to the payee's 130 stored value account 190-2. Other embodiments could avoid the payor's 110 stored value account 190-1 and directly transfer the credit from the first intermediary 160-1 to the payee's 130 stored value account 190-2. For example, the first intermediary 160-1 may be a credit card company that adds money to the stored value account 190-2 of the payee 130. In other embodiments, money may go from the payor's stored value account 190-1 directly to the second intermediary 160-2. For example, a credit in the stored value account 190-1 of the payor 110 could be sent to a second intermediary 160-2 that issues money orders for pick-up by the payee at a retail location.

Hardware and Software for Implementing Person-to-Person Payments

The payor computer 120, the payee computer 140, and the server hosting the payment enabler 170 may each have typical features of a computer system, such as a processing unit, a system memory containing random access memory (RAM) and read only memory (ROM), and a system bus that couples the system memory to the processing unit. The computer may also include various memory storage devices, such as a hard disk drive, a magnetic disk drive (e.g., to read from or write to a removable magnetic disk), and an optical disk drive (e.g., to read from or write to optical media such as a CD-ROM). The payor computer 120 and the payee computer 140 may also comprise devices capable of wireless access to the Internet 150. Further, the payment enabler 170 may be implemented with a number of such computers interconnected by a network as is well known in the art.

A number of program modules may be stored in the drives and RAM of the computer system. Program modules control how the computer system functions and interacts with the user, with input/output devices, or with other computers. Program modules include routines, an operating system, application program modules, data structures, browsers, and other software or firmware components. The invention may conveniently be implemented in various program modules that are stored on the computers illustrated in the overview 100 and implement the methods described in the detailed description.

No particular programming language will be described for carrying out the various procedures described in the detailed description because it is considered that the operations, steps, and procedures described and illustrated in the accompanying drawings are sufficiently disclosed to permit one of ordinary skill in the art to practice an exemplary embodiment of the present invention. Moreover, there are many computers and operating systems which may be used in practicing an exemplary embodiment, and therefore no detailed computer program could be provided which would be applicable to all of these many different systems. Each user of a particular computer will be aware of the language and tools which are most useful for that user's needs and purposes.

One skilled in the art should recognize that the various computers 120, 140, 170 may require one or more databases for storing information pertinent to their roles in the person-to-person payment methods of the present invention. In the detailed description, these databases may be described with respect to their functionality or the information stored. One skilled in the art should recognize that a variety of different database implementations are capable of providing the described functionality or storing the described information. Accordingly, details of such database implementations need not be described. Where details of a database implementation are described, the detailed description provides them by way of example, not by way of limitation.

Accessing the Functionality of the Payment Enabler

Figure 2:
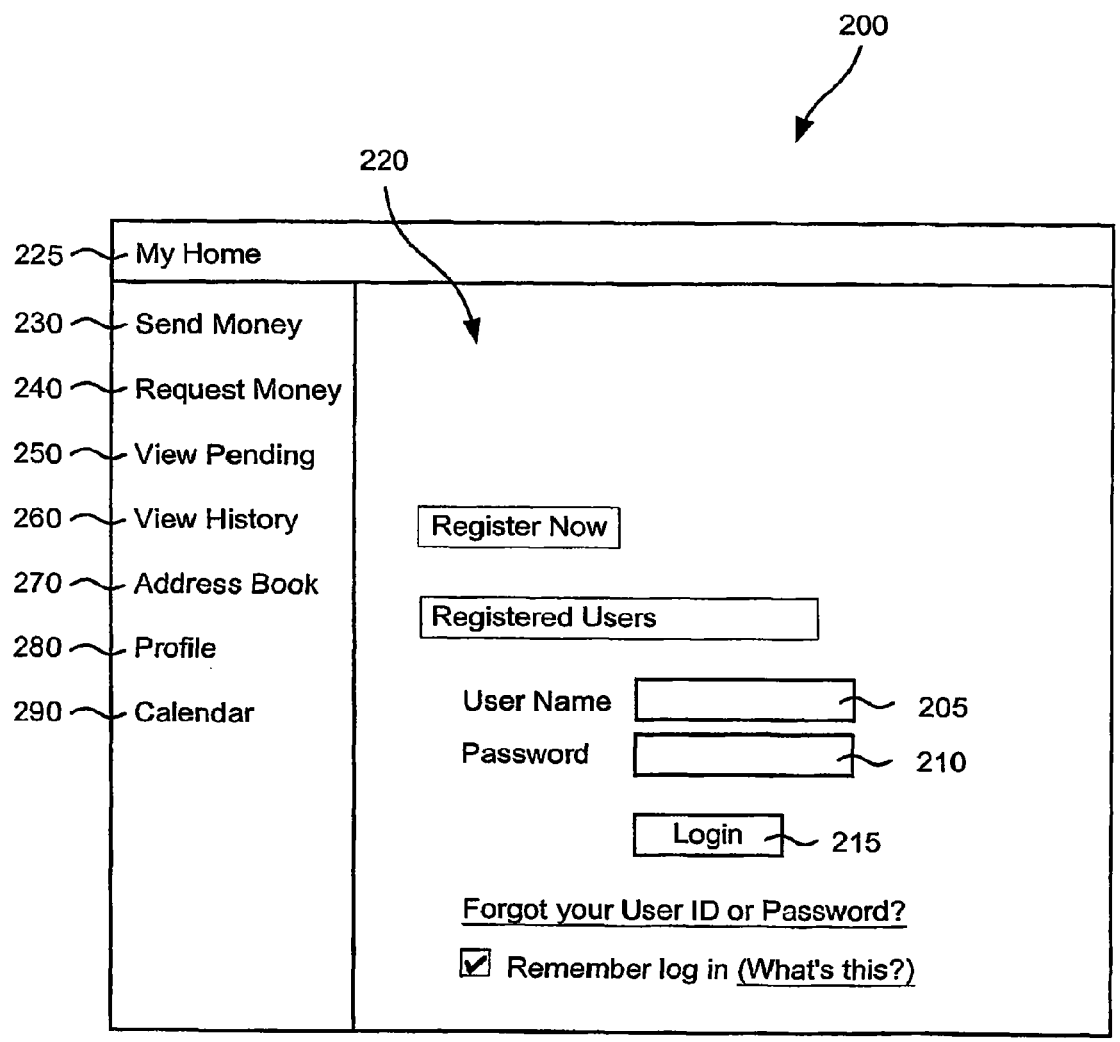
FIG. 2 is a block diagram illustrating a log-in Web page for accessing an account with the payment enabler in accordance with an exemplary embodiment of the present invention.

FIG. 2 is a screen shot illustrating an exemplary login Web page 200 through which a user of the payment enabler 170 can access his or her account. This account enables the user to access the features of the payment enabler. If the user makes a payment 180 to another individual using the payment enabler 170, then the user is referred as the payor 110 with respect to that particular transaction. If the user receives a payment from another individual through the payment enabler 170, then that user is referred to as a payee 130 with respect to that particular transaction. Through the account, the user also has access to other functionality of the payment enabler 170 for facilitating the management of that user's financial transactions.

As already described, the payment enabler 170 may require the user to undergo a registration process before activating an account for the user. As a result of that registration process, the user may be assigned a user name and a password. To access his or her account, the user enters the assigned user name in box 205 and the password in box 210. When the user next clicks the "LOGIN" button 215, the payment enabler 170 determines if the password on file for the account associated with the user name supplied by the user matches the password supplied by the user. If so, then the payment enabler 170 grants the user access to the account associated with the user name supplied by the user.

The leftmost side of the login Web page 200 may have several buttons 225, 230, 240, 250, 260, 270, 280, 290, each labeled and associated with a particular feature of the payment enabler 170. By selecting a particular button, perhaps with a pointing device such as a mouse, the user can access the feature of the payment enabler associated with that button. These buttons 225, 230, 240, 250, 260, 270, 280, 290 are typically inactive until the user has been granted access to the user's account through the login process.

The features associated with each of the buttons 225, 230, 240, 250, 260, 270, 280, 290 are now discussed in turn. In response to the user clicking the button 225, the payment enabler 170 may provide the user with a Web page alerting the user to new money requests received and payments completed since this button was previously selected. In response to the user clicking the button 230, the payment enabler 170 initiates the "send money" process 600 (described in more detail later in conjunction with the description of FIGS. 6-8), which allows the user (the payor 110 with respect to this transaction) to send money to another individual, the payee 130. In response to the user clicking the button 240, the payment enabler 170 initiates the "request money" process 900 (described in more detail later in conjunction with the description of FIGS. 9 and 10), which allows the user (the payee 130 with respect to this transaction) to request money from another individual, the payor 110.

In response to the user clicking the button 250, the payment enabler 170 provides the user with an online statement of pending "send money" or "request money" transactions. In response to the user clicking the button 260, the payment enabler 170 provides the user with an online statement of history (i.e., past or completed) "send money" or "request money" transactions. Such an online statement of completed transactions is further described in more detail later in conjunction with the description of FIG. 3.

In response to the user clicking the button 270, the payment enabler 170 provides the user with an address book interface 400 (described in more detail later in conjunction with the description of FIG. 4). This address book interface 400 provides the user with extensive address book functionality.

In response to the user clicking the button 280, the payment enabler 170 provides the user with a Web page having a summary of the user's profile (i.e., registration information). Through this Web page, the user may be able to update his or her profile. Updating profile information may include adding or deleting money transfer methods for either making payments or receiving payments. The user may also change the default payment or money receipt method for the user's account through this feature.

In response to the user clicking the button 290, the payment enabler 170 may provide the user with an online calendar through which the user can keep track of various events, including but not limited to financial transactions. Such online calendars are well known to those skilled in the art. The calendar may automatically indicate future and recurring transactions that have been scheduled. Such scheduled transactions may include automatic initiation of a payment or sending of a money request. By clicking on a transaction listed on the online calendar, the user can change the details (including scheduling) of the transaction.

The above embodiment allows sending payment 180 to a single payee 130, however, other embodiments could send payment to a number of payees. The payor may enter a list of e-mail addresses for the payees manually, load that list from a file or select existing entries from the address book. The address book may include a group of individuals. The group can be selected as the payees. Further, each individual in the group could receive the same or a different amount of payment 180 in their stored value account.

Figure 3:
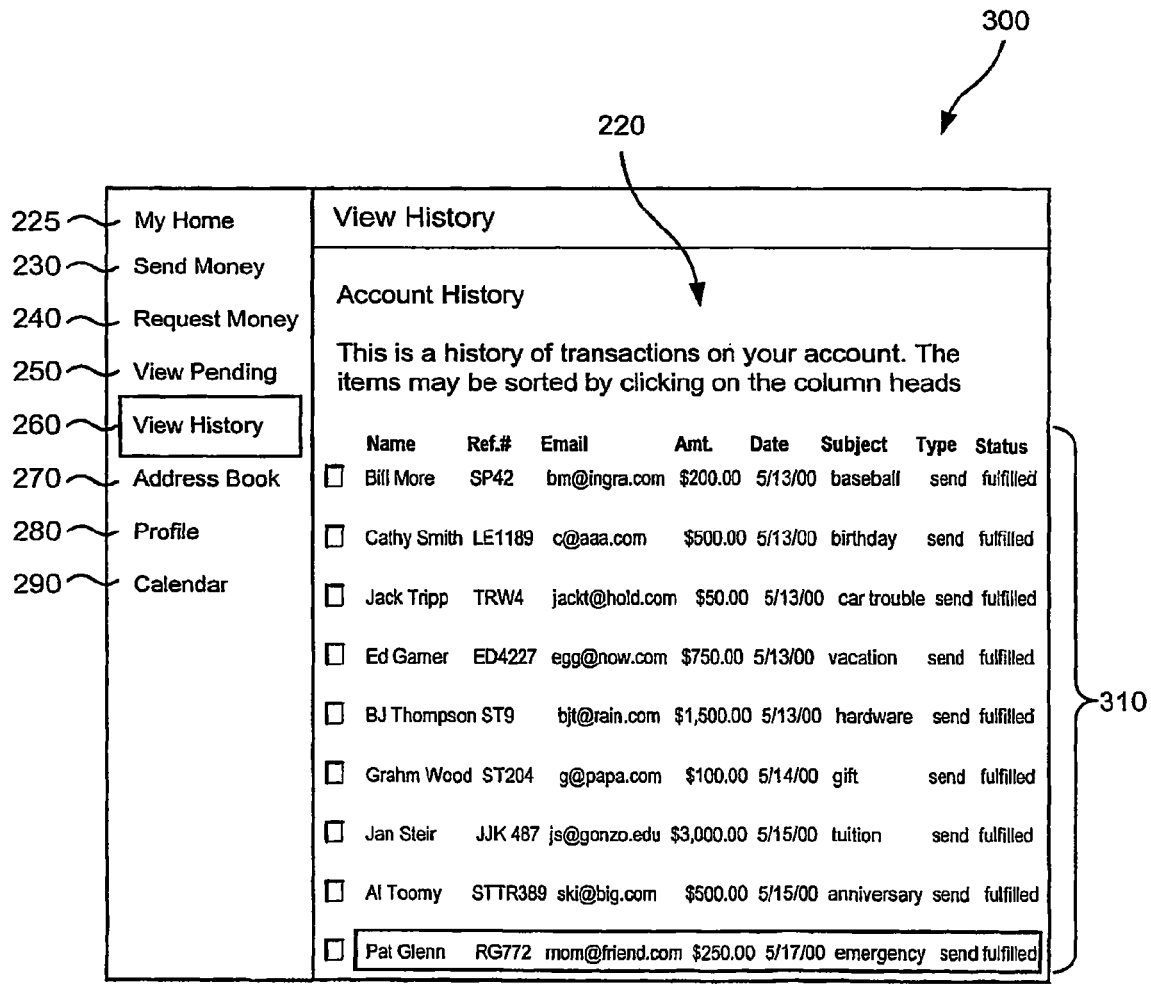
FIG. 3 is a block diagram illustrating an account history Web page in accordance with an exemplary embodiment of the present invention.

When a particular button 225, 230, 240, 250, 260, 270, 280, 290 is selected, the payment enabler 170 typically highlights it and provides the selected functionality in the large area 220 of the graphical user interface. The buttons 225, 230, 240, 250, 260, 270, 280, 290 may be displayed on all Web pages provided to the user by the payment enabler 170 in order to provide the user with an easy way to switch between features of the payment enabler while logged into his or her account.
Online Statements of Pending and Completed Transactions FIG. 3 is a screen shot illustrating an exemplary account history Web page 300, which the user may access by selecting the "View History" button 260. The online statement of history transactions is displayed in the area 220 of the Web page. Because the button 260 has been selected, it is shown highlighted. The other buttons 225, 230, 240, 250, 270, 280, 290 are provided toward the leftmost side of the Web page to allow the user to easily switch to other features of the payment enabler 170. As those skilled in the art appreciate, there may be levels of menus with additional buttons to access some of the other functions.

The online statement of history transactions comprises completed transactions 310. A given transaction may comprise a "send money" transaction or a "request money" transaction depending on whether the user wishes to send money to another individual or requested money from another individual. Each of the transactions 310 occupies one row of the area 220 and includes entries for each of the columns 320, 330, 340, 350, 360, 370, 380, 390. By clicking on a column head, the user can sort the transactions 310 by their entries for the column corresponding to that column head.

For each of the transactions 310, the entry in column 320 comprises the name of the counter party to the transaction. The entry in column 330 comprises a unique reference number assigned to the transaction by the payment enabler 170. The entry in column 340 comprises the e-mail address of the counter party to the transaction. The entry in column 350 comprises the amount 180 that the user sent to or requested from the listed counter party for the transaction. The entry in column 360 comprises the date that the transaction was initiated. The entry in column 370 comprises a subject that the user has provided to identify the transaction.

The entry in column 380 indicates the type of the transaction. For example, the word "send" in this column 380 may indicate a "send money" transaction. "Request" may indicate a "request money" transaction. "Receive" may indicate a transaction in which money was received from another individual who used the "send money" process 600.

In some embodiments of the present invention, a payee 130 in a given transaction has the opportunity to reverse a received payment. In that case, the type column 380 for that transaction may have the word "refund."

The entry in column 390 indicates the status of the transaction. If the transaction has been completed, then the word "fulfilled" may appear in the column 390. In some embodiments of the present invention, a payor 110 in a given transaction has the opportunity to cancel a pending transaction before it is completed. The word "canceled" in the column 390 may indicate such a canceled transaction.

By clicking the button 250, the user of an account can obtain a Web page (not shown) similar to that of FIG. 3 but listing only pending transactions. Pending transactions include transactions that the user authorized the payment enabler 170 to initiate but that have not yet been completed. Such transactions may be indicated by the word "pending" in the status field 390.

In some embodiments of the present invention, the payment enabler 170 permits a user who has begun entering transaction details but has not finished to save the details entered up till that point. In such an embodiment, the user can later complete entry of the transaction details and then authorize the payment enabler 170 to initiate the transaction. Such a transaction may be listed in the statement of pending transactions with the word "draft" in the status field.

Address Book Functionality

Figure 4:
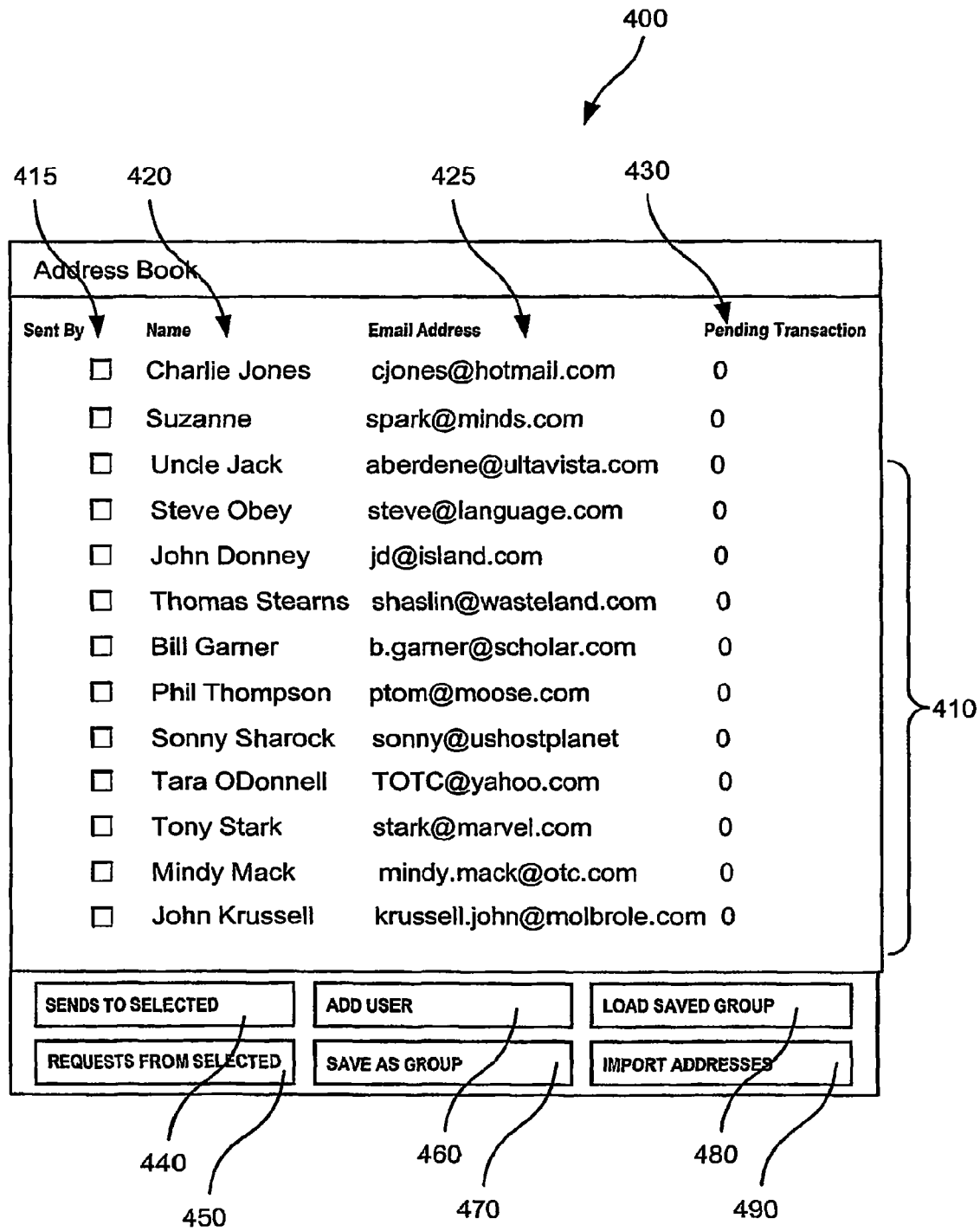
FIG. 4 is a block diagram illustrating an address book interface in accordance with an exemplary embodiment of the present invention.

FIG. 4 is a screen shot illustrating an exemplary address book interface 400. The user may access this address book interface 400 by clicking on the button 270.

The address book interface includes a listing of address book entries 410 for a user-defined group of people. Each address book entry occupies a row of the display and includes information for each of the columns 420, 425, 430. By clicking on a column head for one of these columns, the user can sort the address book entries 410 by their information in the column corresponding to that column head. Column 415 comprises a check box that can be either checked or unchecked for each of the address book entries 410.

For each of the address book entries 410, the information in column 420 comprises the name of a person with an e-mail address. The information in column 425 comprises an e-mail address of the person listed in column 420. The information in column 430 comprises the number of transactions currently pending for the user with the person listed in column 420 as the counter party.

By clicking the button 460, the user can add a new address book entry to the current display of address book entries. There may also be a button (not shown) allowing the user to delete an address book entry from the current display of address book entries.

By clicking the button 470, the user can save the entries 410 in the current display of address book entries for future reference. After the user clicks the button 470, a subsequent Web page may prompt the user for the name under which the group should be saved. If the group being saved is an update to a group that was earlier saved, the Web page may provide the user the option to replace the old group by saving the updated group under the same name as the old group was saved.

By clicking the drop-down menu 480, the user can select a previously saved group. In response, the payment enabler provides the user with a Web page like that of FIG. 4, except the address book entries 410 of the current group are replaced with address book entries for the selected group.

By making a selection from the drop-down menu 490, the user can import address book entries from other programs. Once imported, these address book entries will be displayed on a Web page similar to that of FIG. 4 as the address book entries 410.

By clicking on the button 440, the user initiates the "send money" process 600 (discussed later) to send money to all the individuals whose address book entries 410 are checked in column 415. By clicking on the button 450, the user initiates the "request money" process 900 (discussed later) to request money from all the individuals whose address book entries 410 are checked in column 415. When the "send money" process 600 and the "request money" process 900 are initiated in this manner through the address book interface 400, the user need not later specify again the individuals (and their e-mail addresses) to whom the User wishes to pay money or from whom the user wishes to request money.

The user may check the check box (column 415) for one or more of the address book entries 410 by clicking on that check box. The user may uncheck an already checked check box by clicking on it again.

Registration for an Account With the Payment Enabler

Figure 5:
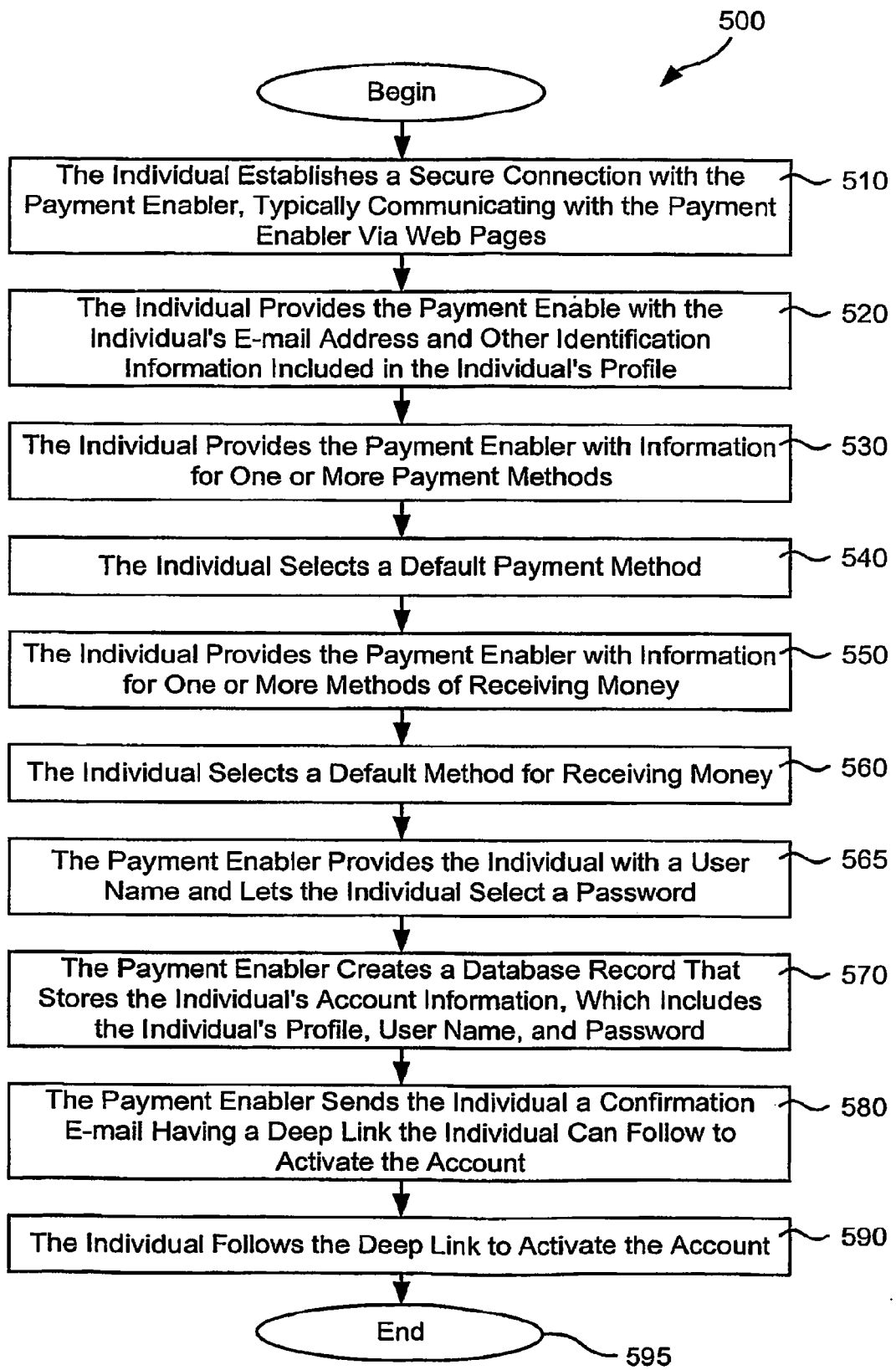
FIG. 5 is a flow chart illustrating steps for registration of an individual for an account with the payment enabler in accordance with an exemplary embodiment of the present invention.

FIG. 5 is a logical flow diagram 500 illustrating exemplary steps for registration of an individual for an account with the payment enabler 170. The registration process begins with step 510. For transactions that send payment to one or more groups of individuals, a listing of all groups is shown in a manner similar to that of FIG. 4. A set payment may be configured for the whole group or different payment amounts 180 and/or different payment methods may be selected for each individual.

In step 510, the individual establishes a secure connection with the payment enabler 170. Typically, the individual communicates with the payment enabler 170 via Web pages. In step 520, the individual provides the payment enabler 170 with the individual's e-mail address and other identification information included in the individual's profile.

In step 530, the individual provides the payment enabler 170 with information for one or more payment methods. In step 540, the individual selects a default payment method.

In step 550, the individual provides the payment enabler 170 with information for one or more methods of receiving money. In step 560, the individual selects a default method for receiving money.

In step 565, the payment enabler 170 provides the individual with a user name and password. Alternatively, the payment enabler 170 may permit the individual to choose his or her own password. In some embodiments, the e-mail address serves as the user name.

In step 570, the payment enabler 170 creates a database record that stores the individual's account information. This account information includes the profile of the individual, as well as the individual's user name and password. This database record may also include a pending transactions file and a history transactions file that store the information that the payment enabler 170 respectively uses to produce at the individual's request the online statement of pending transactions for the individual and the online statement of history transactions for the individual.

In step 580, the payment enabler 170 sends the individual a confirmation e-mail having a deep link that the individual can follow to activate the account. In step 590, the individual follows the deep link to activate the account. The registration process then ends in step 595. Once the account is activated, a stored value account 190 is created that is linked to the individual.

Sending Money to Other Individuals

Figure 6:
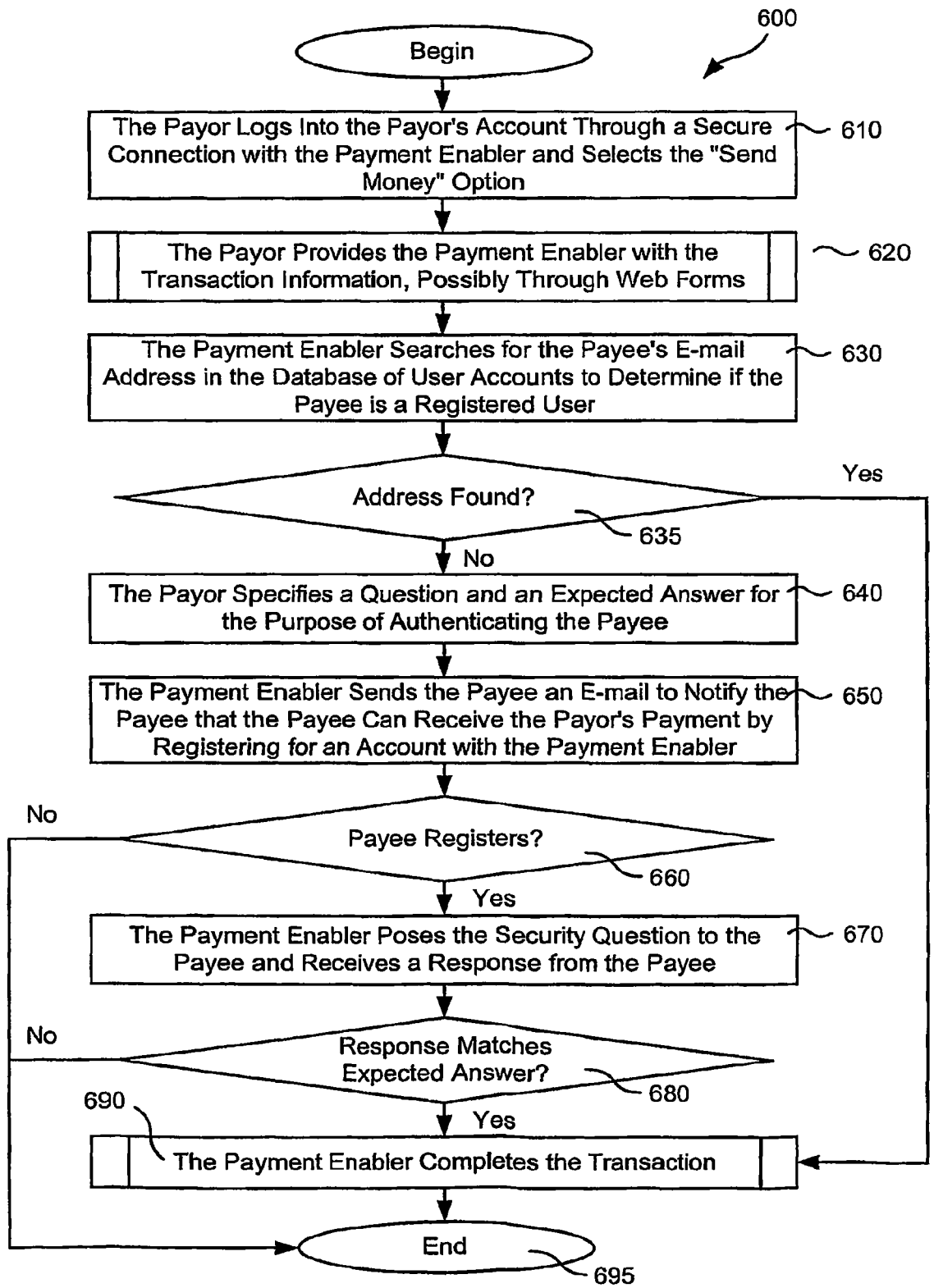
FIG. 6 is a flow chart illustrating the steps of a process through which a payor can send money in accordance with an exemplary embodiment of the present invention.

FIG. 6 is a logical flow diagram 600 illustrating exemplary steps for a send money process 600 in which a payor 110 can send money 180 to a payee 130. The send money process 600 begins with step 610.

In step 610, the payor 110 logs into the payor's account through a secure connection with the payment enabler 170 and selects the "send money" option, perhaps by clicking the "send money" button 230.

In step 620, the payor 110 provides the payment enabler 170 with the send money transaction information. The payor 110 may communicate this information to the payment enabler 170 through Web forms.

In step 630, the payment enabler 170 searches for the e-mail address of the payee 130 in the database of user accounts to determine if the payee is a registered user. In step 635, the payment enabler 170 determines if the e-mail address of the payee 130 was found. If the e-mail address of the payee 130 was found, then the "YES" branch is followed to step 690 because the payee is already a registered user. In that case, the payment enabler 170 completes the transaction in step 690 before the send money process 600 ends in step 695.

Referring again to step 635, if the payment enabler 170 determines that the e-mail address of the payee 130 was not found, then the "NO" branch is followed to step 640 because the payee is not already a registered user. In step 640, the payor 110 specifies a question and an expected answer for the purpose of authenticating the payee 130. Although this embodiment uses a secret question for authentication, other embodiments could use encryption, a certificate, a biometric device or other technology for authorization.

In step 650, the payment enabler 170 sends the payee 130 an e-mail to notify the payee that the payee can receive the payment from the payor 110 by registering for an account with the payment enabler. The e-mail may include a link that the payee 130 can follow to register for the account with the payment enabler 170. In step 660, the payment enabler 170 determines if the payee registers for an account with the payment enabler.

If the payee 130 never registers for an account with the payment enabler 170, then the "NO" branch is followed to step 695, and the send money process 600 ends. If, in step 660, the payee 130 does register for an account with the payment enabler 170, then the "YES" branch is followed to step 670.

In step 670, the payment enabler 170 poses the security question to the payee 130 and receives a response from the payee. In step 680, the payment enabler 170 determines if the response matches the expected answer to the security question that was entered by the payor 110 in step 640. If the response does not match the expected answer, then the "NO" branch is followed to step 695, and the send money process 600 ends.

If the response does match the expected answer in step 680, then the "YES" branch is followed to step 690. In step 690, the payment enabler 170 completes the transaction. The send money process 600 then ends in step 695.

In the above embodiment, the payee 130 interacts with the payment enabler 170 in order to transfer payment 180 to a stored value account 160-2 for the payee. Other embodiments could send the payment 180 directly to the payee without the need for interaction with the payment enabler 170, by sending a check or other instrument directly to the payee 130. Further, the payee may merely be informed of the payment 180 and pick-up the payment from an intermediary 160 with a retail storefront.

Figure 7:
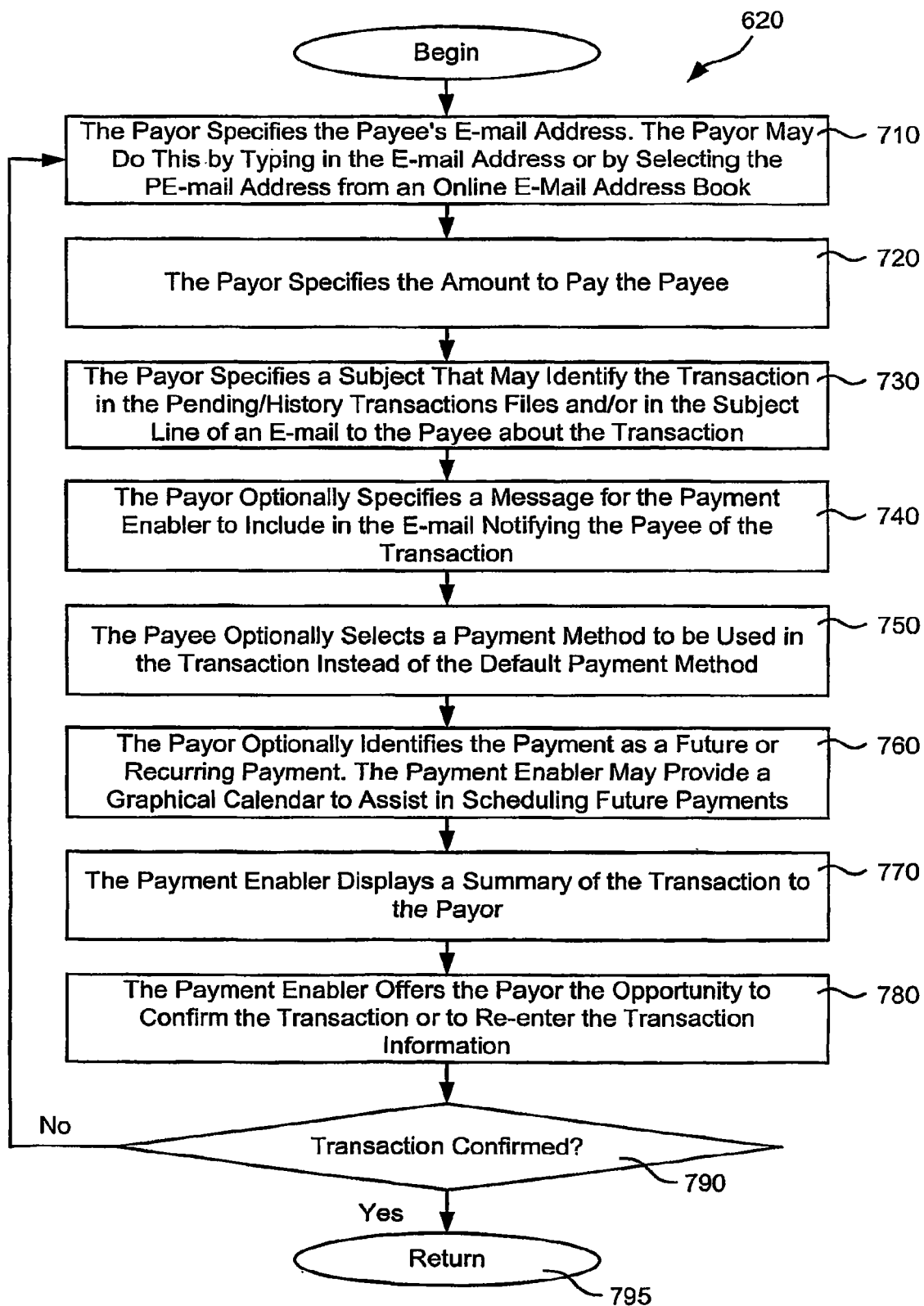
FIG. 7 is a flow chart illustrating the steps by which a payor can provide transaction information to the payment enabler so that the payment enabler can process a "send money" command in accordance with an exemplary embodiment of the present invention.

FIG. 7 is a logical flow diagram 620 illustrating exemplary steps for provision of the "send money" transaction information to the payment enabler 170 by the payor 110. The logical flow diagram of FIG. 7 comprises an exemplary process corresponding to routine 620 on FIG. 6. The routine 620 begins with step 710.

In step 710, the payor 110 specifies the e-mail address of the payee 130. The payor 110 may do this by typing in the e-mail address or by selecting the e-mail address from an online e-mail address book. Other embodiments could use any unique identifier and not just an e-mail address.

In step 720, the payor 110 specifies the amount 180 to pay the payee 130. In step 730, the payor 110 may specify a subject that may identify the transaction in the pending and history transactions files. The subject may also identify the transaction in the subject line of an e-mail to the payee 130 about the transaction. If an auction payment, the subject may include an auction identifier such as an auction listing title and/or an auction number. In step 740, the payor 110 optionally specifies a message for the payment enabler 170 to include in the e-mail notifying the payee 130 of the transaction.

In step 750, the payor 110 optionally selects a payment method to be used in this transaction instead of the default payment method. In step 760, the payor 110 optionally identifies the payment 180 as a future or a recurring payment. The payment enabler 170 may provide a graphical calendar to assist in scheduling future payments. For example, the payor 110 may click a box corresponding to a specific day to schedule the payment 180 for that day. In some embodiments, the payor 110 may indicate payment should be a check, money order, gift certificate, or other instrument. The instrument could be mailed directly to a payee address provided by the payor 110 or picked-up by the payee 130 at a local storefront.

In step 770, the payment enabler 170 displays a summary of the transaction to the payor 110. In step 780, the payment enabler 170 offers the payor 110 the opportunity to confirm the transaction or to reenter the transaction information. In step 790, the payment enabler 170 determines if the payor 110 has confirmed the transaction. If the transaction is confirmed, then the "YES" branch is followed to step 795, and the routine 620 returns. However, if the payment enabler 170 determines in step 790 that the payor 110 has decided not to confirm the transaction, then the "SNO" branch is followed back to step 710, and the payor reenters the transaction information.

Figure 8:
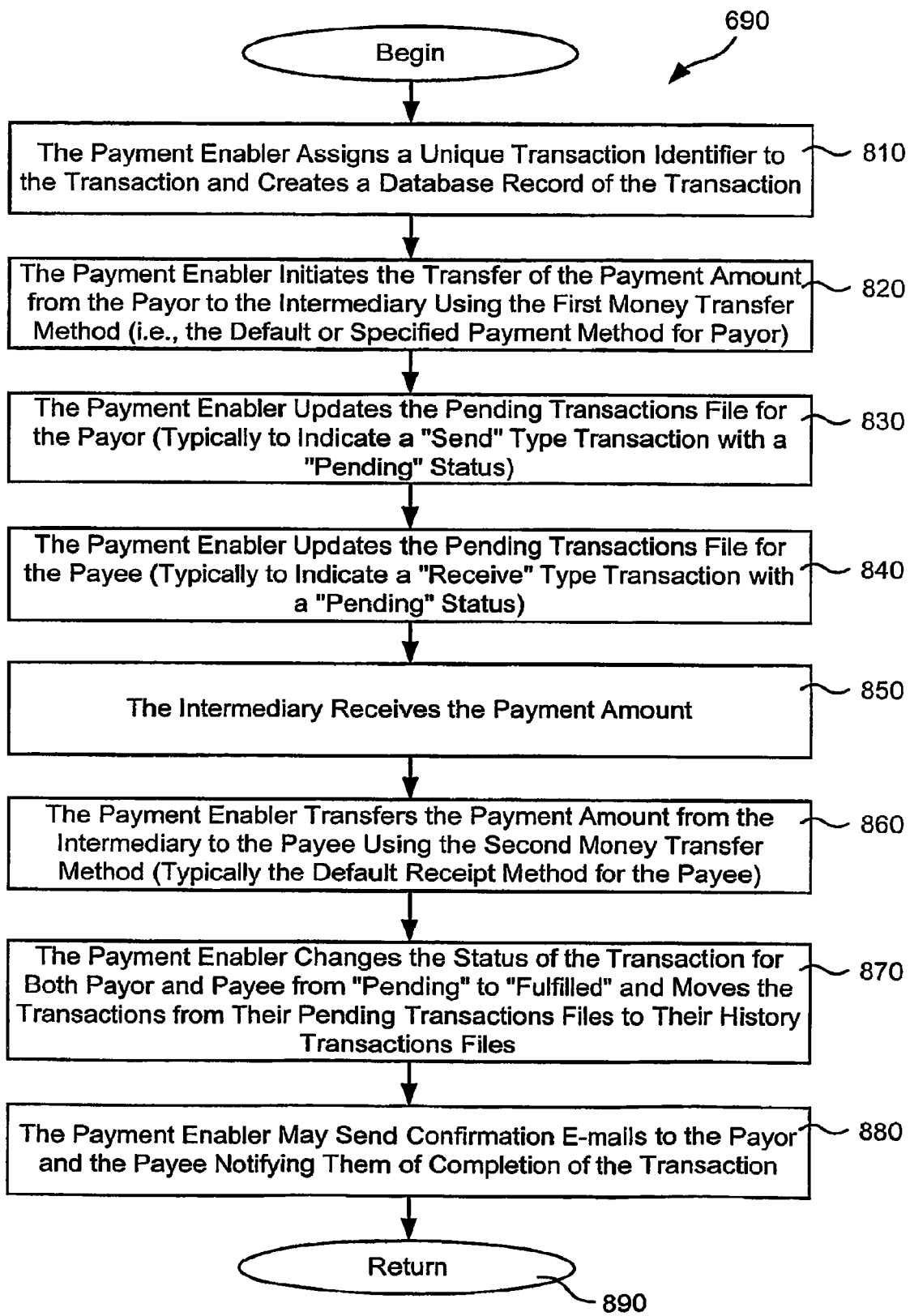
FIG. 8 is a flow chart illustrating the steps for completion of a "send money" transaction by the payment enabler in accordance with an exemplary embodiment of the present invention.

FIG. 8 is a logical flow diagram 690 illustrating exemplary steps for completion of the "send money" transaction by the payment enabler 170. The logical flow diagram of FIG. 8 comprises an exemplary process corresponding to routine 690 of FIG. 6. The routine 690 begins with step 810.

In step 810, the payment enabler 170 assigns a unique transaction identifier to the transaction and creates a database record of the transaction. This unique identifier may be used to access the record of a transaction whenever a customer inquires about the transaction.

In step 820, the payment enabler 170 initiates the transfer of the payment amount 180 from the payor 110 to the intermediary 160 using the first money transfer method. Some embodiments may move the payment from the payor's stored value account 190-1 to the payee's stored value account 190-2 to accomplish the transfer. If the payor 110 identified the payment 180 as a future or recurring payment in step 760 of FIG. 7, then the payment enabler 170 waits until the specified time or times to initiate the transfer of the payment amount 180 from the payor to the intermediary 160.

If the payor 110 specified a particular payment method to be used in this transaction in step 750 of FIG. 7, then that payment method comprises the first money transfer method. Otherwise, the first money transfer method comprises the default payment method specified for the account of the payor 110.

In step 830, the payment enabler 170 updates the pending transactions file for the payor 110. Typically, this update involves adding the transaction to the pending transactions file for the payor 110 as a "send" type transaction with a "pending" status.

In step 840, the payment enabler 170 updates the pending transactions file for the payee 130. Typically, this update involves adding the transaction to the pending transactions file for the payee 130 as a "receive" type transaction with a "pending" status.

In step 850, the intermediary 160 receives the payment amount 180. In step 860, the payment enabler 170 transfers the payment amount 180 from the intermediary 160 to the payee 130 using the second money transfer method. Typically, the second money transfer method comprises the default money receipt method specified for the account of the payee 130.

The payment enabler 170 may send an e-mail to the payee 130 to notify the payee of the money 180 being sent. This e-mail may optionally require that the payee 130 authorize receipt of the money 180 before the payment enabler 170 will complete the payment through the second money transfer method. This e-mail may also optionally offer the payee 130 the opportunity to change the second money transfer method for this particular transaction from the default money receipt method to another money receipt method.

In step 870, the payment enabler 17.0 changes the status of the transaction for both the payor 110 and the payee 130 from "pending" to "fulfilled" and moves the transactions from their pending transactions files to their history transactions files.

In step 880, the payment enabler 170 may send confirmation e-mails to the payor 110 and the payee 130 notifying them of completion of the transaction. The routine 690 then returns in step 890.

Requesting Money From Other Individuals

Figure 9:
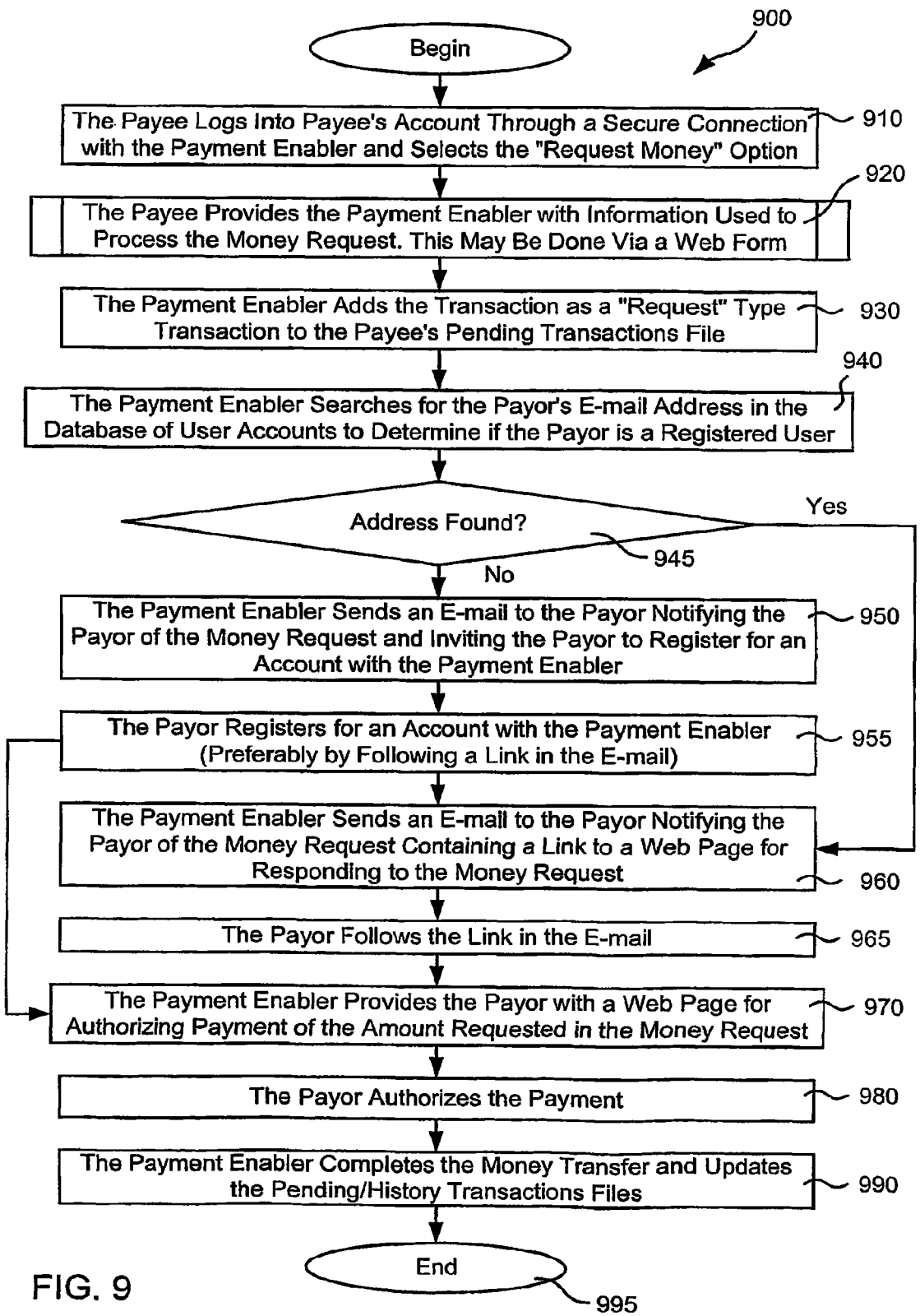
FIG. 9 is a flow chart illustrating the steps of a process through which an individual can request money from another person in accordance with an exemplary embodiment of the present invention.

FIG. 9 is a logical flow diagram 900 illustrating exemplary steps for a request money process 900 in which a payee 130 can request money 180 from a payor 110. The request money process 900 begins with step 910.

In step 910, the payee 130 logs into the payee's account through a secure connection with the payment enabler 170. The payee 130 then selects the "request money" option, perhaps by clicking the "request money" button 240.

In step 920, the payee 130 provides the payment enabler 170 with information used to process the money request: This may be done via a Web page form. In step 930, the payment enabler 170 adds the transaction as a "request" type transaction to the pending transactions file of the payee 130.

In step 940, the payment enabler 170 searches for the e-mail address of the payor 110 in the database of user accounts to determine if the payor is a registered user of the payment enabler 170. In step 945, the payment enabler 170 determines if the address was found. If the address was not found, then the payor 110 does not have an account with the payment enabler 170, and the "NO" branch is followed to step 950.

In step 950, the payment enabler 170 sends an e-mail to the payor 110 notifying the payor of the money request. This e-mail also invites the payor 110 to register for an account with the payment enabler 170.

In step 955, the payor 110 registers for an account with the payment enabler 170. Preferably, the payor 110 reaches a registration page of the payment enabler 170 by following a link in the e-mail. Step 970, to be discussed shortly, is then executed.

Referring again to step 945, if the payment enabler 170 found the e-mail address of the payor 110 in the database of user accounts, then the payor does have an account with the payment enabler, and the "YES" branch is followed to step 960. In step 960, the payment enabler 170 sends an e-mail to the payor 110 notifying the payor of the money request and containing a link to a Web page through which the payor can respond to the money request. In step 965, the payor 110 follows the link in the e-mail, and step 970 is then executed.

Step 970 follows either step 955 or step 965. In step 970, the payment enabler 170 provides the payor 110 with a Web page for authorizing payment of the amount 180 requested in the money request. If step 970 is reached from step 955, then the payment enabler 170 preferably provides this Web page to the payor 110 automatically at the end of the registration process.

In step 980, the payor 110 authorizes the payment 180. In step 990, the payment enabler 170 completes the money transfer with an intermediary 160 acting as a conduit between the payor 110 and the payee 130 in the manner already described. The payment enabler 170 also updates the pending and history transactions files for both the payor 110 and the payee 130. The request money process 900 then ends in step 995.

Figure 10:
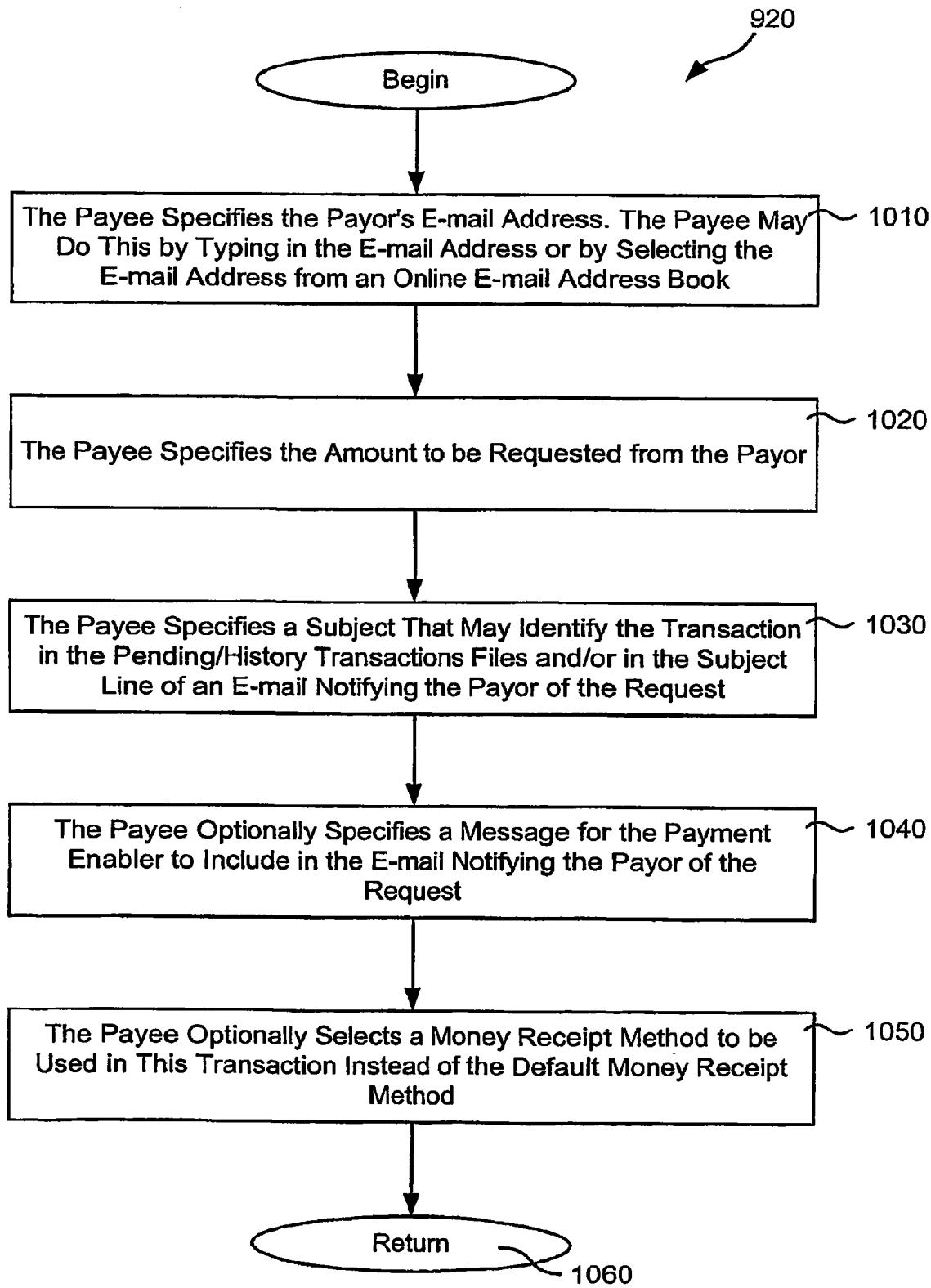
FIG. 10 is a flow chart illustrating the steps by which an individual can provide information used by the payment enabler to process a money request in accordance with an exemplary embodiment of the present invention.

FIG. 10 is a logical flow diagram 970 illustrating exemplary steps by which the payee 130 can provide the payment enabler 170 with the information used by the payment enabler to process the money request. The logical flow diagram of FIG. 10 corresponds to routine 920 on FIG. 9. The routine 920 begins with step 1010.

In step 1010, the payee 130 specifies the e-mail address of the payor 110. The payee 130 may do this by typing in the e-mail address or by selecting the e-mail address from an online e-mail address book such as the one depicted in FIG. 4.

In step 1020, the payee 130 specifies the amount 180 to be requested from the payor 110. In step 1030, the payee 130 specifies a subject that may identify the transaction in the pending and history transactions files. This subject may also comprise the subject line of an e-mail notifying the payor 110 of the money request.

In step 1040, the payee 130 optionally specifies a message for the payment enabler 170 to include in the e-mail notifying the payor 110 of the money request. In step 1050, the payee 130 optionally selects a money receipt method to be used in this transaction instead of the default money receipt method specified in the payee's profile. The routine 930 then returns in step 1060.

A number of variations and modifications of the invention can also be used. The payment capability could be used to pay subscription fees and other electronic costs. For example, the some music web sites charge small fees for downloading music or may charge a small monthly fee. A request could be made to the payor that is fulfilled by transferring funds from the stored value account of the payor to the stored value account of the merchant payee.

While the principles of the invention have been described above in connection with specific apparatuses and methods, it is to be clearly understood that this description is made only by way of example and not as limitation on the scope of the invention.

What is claimed is:

1. A method for transferring money using a computer network, the method comprising:

maintaining a database of counter parties accessible by either the first user or the second user;

saving information on a first credit received for a first user in a stored value account of the first user on a server computer system;

receiving at the server computer system a first request from the first user to send money to a second user based on the stored value account of the first user, wherein the second user is identified to the server computer system by the first user with an e-mail address for the second user;

sending an electronic notification from the server computer to the e-mail address of the second user to notify the second user of the request;

creating a debit in the stored value account of the first user; and sending the requested money to the second user upon a receipt of a second request at the server computer from the second user.

2. The method for transferring money using the computer network as recited in claim 1, wherein the second-listed sending step comprises a step of saving information on a second credit in a stored value account of the second user on the server computer with a value corresponding to the requested money.

3. The method for transferring money using the computer network as recited in claim 1, wherein the second-listed sending step comprises at least one of the following steps:
sending money to a bank account of the second user;
sending a second credit to a credit card or debit card of the second user; and
sending a check or money order to the second user.

4. The method for transferring money using the computer network as recited in claim 1, wherein the second-listed sending step comprises at least one of the following steps:
sending a telegram or greeting card with a check or money order to the second user.

5. The method for transferring money using the computer network as recited in claim 1, wherein the second-listed sending step comprises at least one of the following steps:
sending an electronic greeting card to the second user with an electronic payment notification embedded therewith.

6. The method for transferring money using the computer network as recited in claim 1, wherein the first request comprises the e-mail address of the second user, and wherein the method further comprises:
maintaining a database of email addresses corresponding to individuals having accounts that provide the individuals with functionality offered by the server computer system for online management of financial transactions;
sending, if the e-mail address of the second user is not found in the database, the second user an email to notify the second user that the second user can receive a second credit by registering for a stored value account of the second user; and
saving, if the e-mail address of the second user is found in the database, information on the second credit in the stored value account of the second user.

7. The method for transferring money using the computer network as recited in claim 1, wherein the method further comprises:
storing additional information associated with the first request, the additional information including transaction type information and status information;
providing an account history display including information corresponding to money transfers between the first user and a plurality of second parties, the account history display comprising, for each money transfer request, one or more of the following information items:
a name;
a reference number associated with the payment enabler system;
an email address;
an amount;
a date;
a transaction description; and
the additional information.

8. The method for transferring money using the computer network as recited in claim 1, wherein a second stored value account is associated with the second user, and wherein the method further comprises:
receiving, with a first transfer intermediary interface, the first credit; and
transmitting, with a second transfer intermediary interface, a second credit from the second stored value account.

9. The method for transferring money using the computer network as recited in claim 1, wherein the method further comprises:
selection, by the first user, of at least one of the counter parties as the second user.

10. The method for transferring money using the computer network as recited in claim 1, wherein the method further comprises:
selection, by the second user, of at least one of the counter parties as the first user.

11. The method for transferring money using the computer network as recited in claim 1, wherein the database of counter parties accessible by either the first user or the second user comprises previous first users or second users.

12. The method for transferring money using the computer network as recited in claim 1, wherein sending the requested money to the second user occurs prior to receipt of the first credit.

13. The method for transferring money using the computer network as recited in claim 1, wherein a third party to the server computer system assumes a risk associated with the first credit not being received and applied to the stored value account of the first user.

14. The method for transferring money using the computer network as recited in claim 1, wherein the first credit is received from a first intermediary, and wherein sending the requested money to the second user comprises:
transferring funds from the stored value account of the first user to a stored value account of the second user;
sending the requested money from the stored value account of the second user to the second user via a second intermediary.

* * * * *